United States Patent
Lee et al.

(10) Patent No.: US 11,906,365 B2
(45) Date of Patent: Feb. 20, 2024

(54) LONG-WAVE INFRARED SENSOR AND ELECTRONIC DEVICE INCLUDING THE SAME

(71) Applicant: SAMSUNG ELECTRONICS CO., LTD., Suwon-si (KR)

(72) Inventors: Byungkyu Lee, Seoul (KR); Jinmyoung Kim, Hwaseong-si (KR); Byonggwon Song, Seoul (KR); Yooseong Yang, Yongin-si (KR); Duhyun Lee, Yongin-si (KR); Hyuck Choo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 17/737,183

(22) Filed: May 5, 2022

(65) Prior Publication Data
US 2023/0124189 A1   Apr. 20, 2023

(30) Foreign Application Priority Data
Oct. 15, 2021   (KR) .................. 10-2021-0137824

(51) Int. Cl.
*G01J 5/58* (2022.01)
*G01J 5/10* (2006.01)
*H04N 5/33* (2023.01)
*G01J 5/00* (2022.01)

(52) U.S. Cl.
CPC . *G01J 5/58* (2013.01); *G01J 5/10* (2013.01); *H04N 5/33* (2013.01); *G01J 2005/0077* (2013.01)

(58) Field of Classification Search
CPC ........ G01J 5/58; G01J 5/10; G01J 2005/0077; G01J 2005/106; G01J 5/045; G01J 5/0806; G01J 5/0813; G01J 5/20; G01J 5/024; G01J 5/0808; G01J 2005/202; H04N 5/33
See application file for complete search history.

(56) References Cited

U.S. PATENT DOCUMENTS 5,737,119 A    4/1998  Mladjan et al.
7,510,883 B2 *  3/2009  Chung ............... G01K 7/36
                                                   438/54

FOREIGN PATENT DOCUMENTS

| EP | 3261333 B1 | 1/2021 |
| FR | 3081990 A1 | 12/2019 |
| JP | 3105454 B2 | 10/2000 |
| JP | 2018185186 A | 11/2018 |
| KR | 100152805 B1 | 6/1998 |
| WO | 2021/021690 A1 | 2/2021 |

OTHER PUBLICATIONS

Communication dated Nov. 23, 2022 issued by the European Patent Office in counterpart European Patent Application No. 22175018.5.

\* cited by examiner

*Primary Examiner* — David P Porta
*Assistant Examiner* — Meenakshi S Sahu
(74) *Attorney, Agent, or Firm* — Sughrue Mion, PLLC

(57) ABSTRACT

Provided is a long-wave infrared (LWIR) sensor including a substrate, a magnetic resistance device on the substrate, and an LWIR absorption layer on the magnetic resistance device, wherein a resistance of the magnetic resistance device changes based on temperature, and wherein the LWIR absorption layer is configured to absorb LWIR rays and generate heat.

20 Claims, 22 Drawing Sheets

FIG. 1
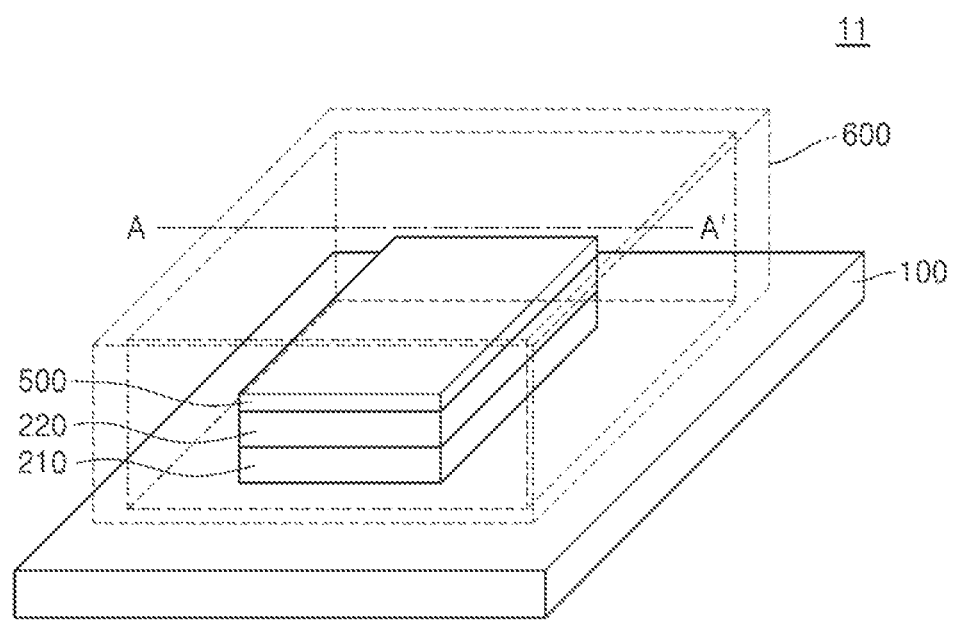
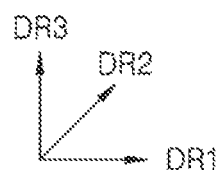

LONG-WAVE INFRARED SENSOR AND ELECTRONIC DEVICE INCLUDING THE SAME

CROSS-REFERENCE TO RELATED APPLICATIONS

This application is based on and claims priority under 35 U.S.C. § 119 to Korean Patent Application No. 10-2021-0137824, filed on Oct. 15, 2021, in the Korean Intellectual Property Office, the disclosure of which is incorporated by reference herein in its entirety.

BACKGROUND

1. Field

The disclosure relates to a long-wave infrared (LWIR) sensor and an electronic device.

2. Description of Related Art

Long-wave infrared (LWIR) sensors may include quantum sensors and thermal sensors. A quantum sensor, which uses photo conduction of a semiconductor material, has excellent quantum efficiency and operates at a very low temperature to have little thermal noise, and thus has excellent detectivity and superior noise equivalent temperature difference (NETD) characteristics. However, areas reacting with infrared rays are determined according to energy gaps, and an operating temperature is around a liquid nitrogen (77K) temperature, for which a vacuum must be maintained. The quantum sensor is highly expensive, and thus, is mainly used for military purposes rather than civilian purposes.

A thermal sensor includes various types of sensors according to the driving principle and materials. For example, a bolometer sensor applies the principle of a change in resistance of a material according to temperature, a pyroelectrics and ferroelectrics sensor uses a change in polarization of a material according to temperature, and a thermopile sensor uses a change in electromotive force according to temperature. A bimetal sensor uses a change in length according to temperature.

SUMMARY

One or more example embodiments provide a miniaturized long-wave infrared (LWIR) sensor and an electronic device including the same.

One or more example embodiments also provide a method of manufacturing an LWIR sensor, the method having excellent compatibility with a general semiconductor process, a low difficulty of a manufacturing process, and reduced manufacturing time and costs.

Additional aspects will be set forth in part in the description which follows and, in part, will be apparent from the description, or may be learned by practice of example embodiments.

According to an aspect of an example embodiment, there is provided a long-wave infrared (LWIR) sensor including a substrate, a magnetic resistance device on the substrate, and an LWIR absorption layer on the magnetic resistance device, wherein a resistance of the magnetic resistance device changes based on temperature, and wherein the LWIR absorption layer is configured to absorb LWIR rays and generate heat.

The magnetic resistance device may include a first magnetic layer, a second magnetic layer on the first magnetic layer, and a tunneling barrier layer between the first magnetic layer and the second magnetic layer.

A thermal stability of the magnetic resistance device may be less than 10.

A width of the magnetic resistance device may range from 1 nm to 100 nm.

The LWIR sensor may further include a reflective layer provided between the substrate and the magnetic resistance device.

The LWIR sensor may further include an insulating layer provided adjacent to a side surface of the magnetic resistance device.

The LWIR sensor may further include a transmissive cap provided on the substrate, wherein the transmissive cap is provided on the magnetic resistance device and the LWIR absorption layer.

An air pressure of an area inside of the transmissive cap may be lower than an air pressure outside of the transmissive cap.

The transmissive cap may be configured to selectively transmit LWIR rays.

The LWIR sensor may further include a focusing lens provided on a first side of the transmissive cap, the side being opposite to a second side of the transmission cap on which the LWIR absorption layer is provided.

The focusing lens may be configured to selectively transmit LWIR rays.

According to another aspect of an example embodiment, there is provide a long-wave infrared (LWIR) sensor including a plurality of pixels provided in a plurality of rows and a plurality of columns, wherein each of the plurality of pixels may include a substrate, a magnetic resistance device on the substrate, and an LWIR absorption layer on the magnetic resistance device, wherein a resistance of the magnetic resistance device changes based on temperature, and wherein the LWIR absorption layer is configured to absorb LWIR rays and emit heat.

The magnetic resistance device may include a first magnetic layer, a second magnetic layer on the first magnetic layer, and a tunneling barrier layer between the first magnetic layer and the second magnetic layer.

A thermal stability of the magnetic resistance device may be less than 10.

The plurality of pixels may further include a plurality of transmissive caps, respectively, and each of the plurality of transmissive caps may be provided on the magnetic resistance device and the LWIR absorption layer.

An air pressure of areas inside of the plurality of transmissive caps may be lower than an air pressure outside of the plurality of transmissive caps.

The plurality of pixels may further include a plurality of focusing lenses, respectively, and the plurality of focusing lenses may face the plurality of transmissive caps, respectively.

The plurality of pixels may further include a plurality of reflective layers, respectively, and each of the plurality of reflective layers may be provided between the substrate and the magnetic resistance device.

In each of the plurality of pixels, the magnetic resistance device may be provided as a single magnetic resistance device or a plurality of magnetic resistance devices.

According to another aspect of an example embodiment, there is provided an electronic device including a long-wave infrared (LWIR) sensor, and a processor configured to receive a sensing signal from the LWIR sensor and process the sensing signal, wherein the LWIR sensor includes a substrate, a magnetic resistance device on the substrate, and an LWIR absorption layer on the magnetic resistance device, wherein a resistance of the magnetic resistance device changes based on temperature, and wherein the LWIR absorption layer is configured to absorb LWIR rays and emit heat.

According to another aspect of an example embodiment, there is provided a long-wave infrared (LWIR) sensor including a substrate, a magnetic resistance device on the substrate, and an LWIR absorption layer on the magnetic resistance device, the LWIR absorption layer being configured to absorb LWIR rays and generate heat, wherein a resistance of the magnetic resistance device changes based on a temperature change based on the heat generated by the LWIR absorption layer.

BRIEF DESCRIPTION OF THE DRAWINGS

The above and/or other aspects, features, and advantages of example embodiments will be more apparent from the following description taken in conjunction with the accompanying drawings, in which:

FIG. 1 is a perspective view of a long-wave infrared (LWIR) sensor according to an example embodiment;

DETAILED DESCRIPTION

Figure 2:
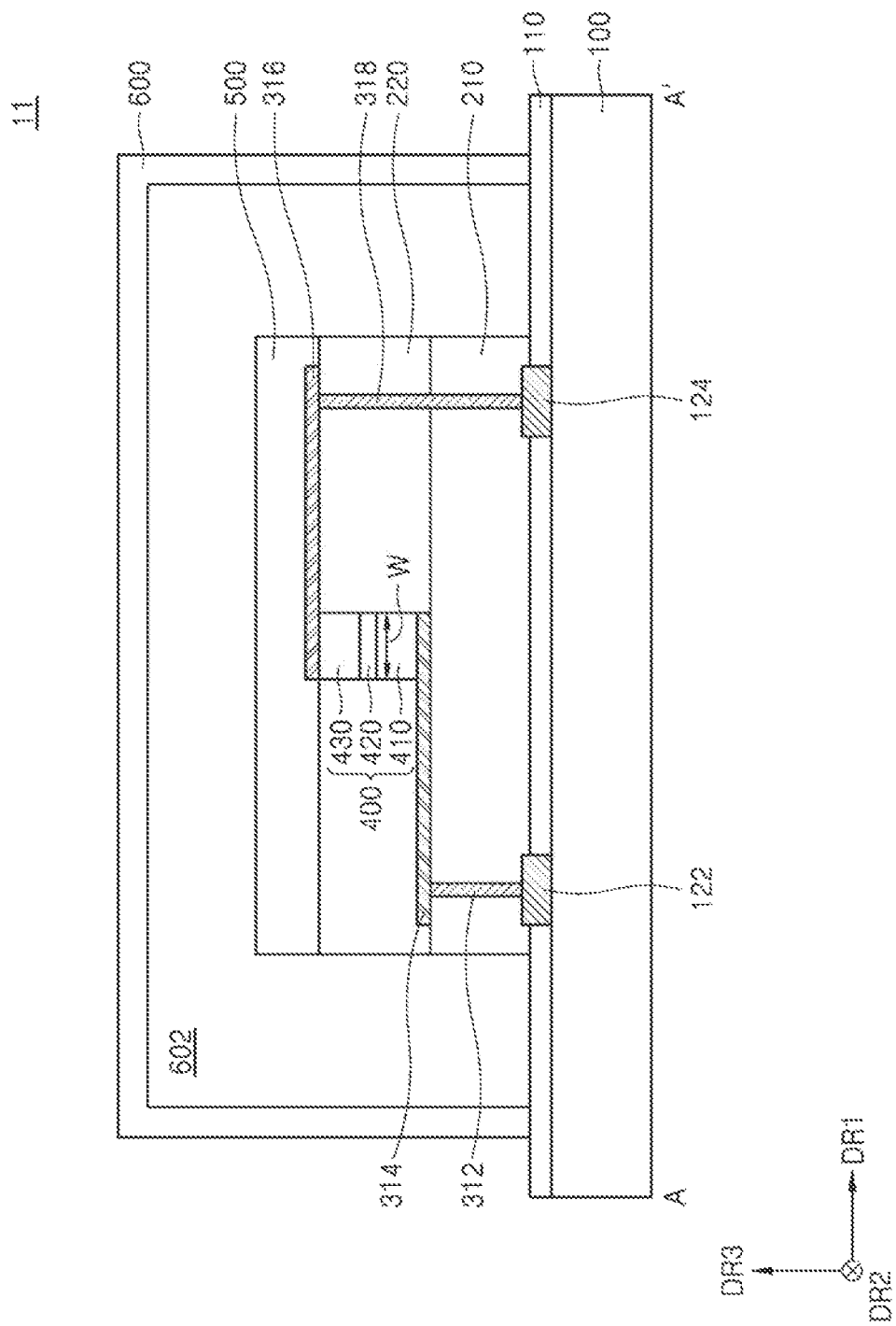
FIG. 2 is a cross-sectional view of the LWIR sensor of FIG. 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail by referring to the accompanying drawings. In the drawings, the same reference numerals denote the same elements and sizes of elements may be exaggerated for clarity and convenience of explanation. Also, the embodiments described hereinafter are only examples, and various modifications may be made based on the embodiments.

Hereinafter, it will be understood that when an element is referred to as being "on" another element, the element can be directly over or under the other element and directly on the left or on the right of the other element, or intervening elements may also be present therebetween.

As used herein, the singular terms "a" and "an" are intended to include the plural forms as well, unless the context clearly indicates otherwise. It will be further understood that when a part "includes" or "comprises" an element, unless otherwise defined, the part may further include other elements, not excluding the other elements.

Also, the term, such as "unit," etc., described in the specification denotes a unit configured to process at least one function or operation.

Hereinafter, "at least one of a, b, and c" is to be understood to include "only a," "only b," "only c," "a and b," "a and c," "b and c," or "a, b, and c."

FIG. 1 is a perspective view of a long-wave infrared (LWIR) sensor 11 according to an example embodiment. FIG. 2 is a cross-sectional view of the LWIR sensor 11 of FIG. 1.

Referring to FIGS. 1 and 2, a substrate 100 may be provided. The substrate 100 may extend in a first direction DR1 and a second direction DR2. For example, the first direction DR1 and the second direction DR2 may intersect with each other. The substrate 100 may include a semiconductor material. For example, the substrate 100 may include silicon (Si), germanium (Ge), or silicon germanium (SiGe). The substrate 100 may include electronic devices and wires. For example, the substrate 100 may include a readout integrated circuit (ROIC) substrate controlling the LWIR sensor 11. The electronic devices and the wires may apply a voltage or a current to a magnetic resistance device 400 to be described below and may transmit a resistance change signal of the magnetic resistance device 400 to a processor outside the LWIR sensor 11.

A passivation layer 110 may be provided on the substrate 100. The passivation layer 110 may include an insulating material. For example, the passivation layer 110 may include an oxide, a nitride, or a combination thereof. For example, the passivation layer 110 may include at least one of silicon oxide ($SiO_2$), aluminum oxide ($Al_2O_3$), hafnium oxide ($HfO_2$), and silicon nitride ($Si_xN_y$).

A first pad 122 and a second pad 124 may be provided on the substrate 100. The first pad 122 and the second pad 124 may penetrate the passivation layer 110 and contact the substrate 100. The first pad 122 and the second pad 124 may be electrically connected to different wires mounted on the substrate 100 from each other. The first pad 122 and the second pad 124 may include an electrically conductive material. For example, the first pad 122 and the second pad 124 may include at least one of titanium nitride (TiN), platinum (Pt), palladium (Pd), tungsten (W), titanium (Ti), aluminum (Al), nickel (Ni), molybdenum (Mo), copper (Cu), and gold (Au).

A lower insulating layer 210 may be provided on the passivation layer 110. The lower insulating layer 210 may cover the first pad 122 and the second pad 124. The lower insulating layer 210 may include an insulating material. For example, the lower insulating layer 210 may include an oxide, a nitride, or a combination thereof. For example, the lower insulating layer 210 may include at least one of $SiO_2$, $Al_2O_3$, $HfO_2$, and $Si_xN_y$. A thickness of the lower insulating layer 210 may be about 0.5 to about 1 μm.

The magnetic resistance device 400 may be provided on the lower insulating layer 210. The magnetic resistance device 400 may have a resistance varying according to a temperature. For example, as the magnetic resistance device 400 has an increased temperature, the magnetic resistance device 400 may have a decreased resistance. For example, the magnetic resistance device 400 may include a tunnel magnetoresistance (TMR) device, a giant magnetoresistance (GMR) device, or a spin-orbit torque (SOT) device. A width W of the magnetic resistance device 400 may be greater than or equal to about 1 nm. When the width W of the magnetic resistance device 400 is less than 1 nm, the intrinsic characteristic of a material may be lost, and a process difficulty may be increased. The magnetic resistance device 400 may have an area that is less than or equal to about 100 nm×100 nm. When the magnetic resistance device 400 has an increased area, a magnitude of a detected current transmitted through the magnetic resistance device 400 may increase, and thus, Joule's heat may occur in the magnetic resistance device 400. The Joule's heat occurring in the magnetic resistance device 400 may cause a reduction of sensing precision of the LWIR sensor 11. When the magnetic resistance device 400 has an area that is greater than 100 nm×100 nm, it may be difficult to control the Joule's heat occurring in the magnetic resistance device 400. The width W of the magnetic resistance device 400 in the first direction DR1 or the second direction DR2 may be less than or equal to about 100 nm. For example, when the magnetic resistance device 400 has a square pillar shape, the width W of the magnetic resistance device 400 may be less than or equal to about 100 nm. For example, when the magnetic resistance device 400 has a cylindrical shape, a diameter of the magnetic resistance device 400 may be less than or equal to about 100 nm. The magnetic resistance device 400 may have a low thermal stability. For example, the thermal stability of the magnetic resistance device 400 may be less than about 10.

The magnetic resistance device 400 may include a first magnetic layer 410, a second magnetic layer 430, and a tunneling barrier layer 420. The first magnetic layer 410, the second magnetic layer 430, and the tunneling barrier layer 420 may be referred to as a magnetic tunnel junction (hereinafter, MTJ). The first magnetic layer 410, the tunneling barrier layer 420, and the second magnetic layer 430 may be arranged in a third direction DR3 crossing the first direction DR1 and the second direction DR2. For example, the third direction DR3 may be perpendicular to an upper surface of the substrate 100. The first magnetic layer 410 and the second magnetic layer 430 may have a horizontal magnetization direction or a vertical magnetization direction. The horizontal magnetization direction may refer to a magnetization direction that is parallel to the upper surface of the substrate 100. The vertical magnetization direction may refer to a magnetization direction that is vertical to the upper surface of the substrate 100. The first magnetic layer 410 may be a pinned layer having a pinned magnetization direction. The second magnetic layer 430 may be a free layer having a magnetization direction that may be changed to a direction that is parallel or anti-parallel to the magnetization direction of the first magnetic layer 410. In this specification, states in which the magnetization direction of the second magnetic layer 430 is parallel and anti-parallel to the magnetization direction of the first magnetic layer 410 are referred to as a "parallel state" and an "anti-parallel state," respectively.

For example, the first magnetic layer 410 may have a horizontal magnetization direction that is pinned in a direction parallel to the upper surface of the substrate 100. For example, the first magnetic layer 410 may have a magnetization direction pinned in the first direction DR1. The first magnetic layer 410 may include a ferromagnetic material. For example, the first magnetic layer 410 may include at least one of an iron (Fe) alloy, a cobalt (Co) alloy, or a nickel (Ni) alloy having a magnetic property. For example, the first magnetic layer 410 may include at least one of cobalt iron boron (CoFeB), cobalt iron (CoFe), nickel iron (NiFe), cobalt iron platinum (CoFePt), cobalt iron palladium (CoFePd), cobalt iron chromium (CoFeCr), cobalt iron terbium (CoFeTb), cobalt iron gadolinium (CoFeGd), and cobalt iron nickel (CoFeNi). For example, a thickness of the first magnetic layer 410 may be less than or equal to about 1 μm.

For example, the first magnetic layer 410 may have a vertical magnetization direction that is pinned in a direction vertical to the upper surface of the substrate 100. For example, the first magnetic layer 410 may have a magnetization direction that is pinned in the third direction DR3. The first magnetic layer 410 may include at least one of a vertical magnetic material (CoFeTb, CoFeGd, cobalt iron dysprosium (CoFeDy), etc.), a vertical magnetic material having an $L1_0$ structure (FePt) having an $L1_0$ structure, FePd having an $L1_0$ structure; CoPd having an $L1_0$ structure, CoPt having an $L1_0$ structure, etc.), a CoPt alloy having a hexagonal close packed lattice structure, and a vertical magnetic structure. The vertical magnetic structure may include magnetic patterns and non-magnetic patterns alternately and repeatedly stacked. For example, the vertical magnetic structure may include a(Co/Pt)n stack structure, a (CoFe/Pt)n stack structure, a (CoFe/Pd)n stack structure, a (Co/Pd)n stack structure, a (Co/N)n stack structure, a (Co/Ni)n stack structure, a (CoNi/Pt)n stack structure, a (CoCr/Pt)n stack structure, a (CoCr/Pd)n stack structure (n is a natural number), or a combination thereof. For example, the first magnetic layer 410 may have a thickness that is less than or equal to about 1 μm.

The second magnetic layer 430 may be provided on the first magnetic layer 410. The second magnetic layer 430 may have a magnetization direction that may be changed according to a temperature. When the first magnetic layer 410 has a horizontal magnetization direction, the second magnetic layer 430 may have a magnetization direction that is parallel to the upper surface of the substrate 100. When the first magnetic layer 410 has a vertical magnetization direction, the second magnetic layer 430 may have a magnetization direction that is vertical to the upper surface of the substrate 100. The second magnetic layer 430 may include at least one of a Fe alloy, a Co alloy, or a Ni alloy having a magnetic property. For example, the second magnetic layer 430 may include at least one of CoFeB, CoFe, NiFe, CoFePt, CoFePd, CoFeCr, CoFeTb, CoFeGd, and CoFeNi. For example, the second magnetic layer 420 may have a thickness that is less than or equal to about 1 μm.

The tunneling barrier layer 420 may be arranged between the first magnetic layer 410 and the second magnetic layer 430. The tunneling barrier layer 420 may include a non-magnetic material. For example, the tunneling barrier layer 420 may include at least one of a metal oxide (an aluminum oxide, a magnesium oxide, a titanium oxide, a magnesium-zinc oxide, a magnesium-boron oxide, etc.), graphene, and a non-magnetic metal material (Cu, ruthenium (Ru), tantalum (Ta), etc.). For example, the first magnetic layer 410, the tunneling barrier layer 420, and the second magnetic layer 430 may be a CoFeB layer, a magnesium oxide (MgO) layer, and a CoFeB layer, respectively. The tunneling barrier layer 420 may have a predetermined thickness for heat to sufficiently stay in the magnetic resistance device 400 while electrons tunnel the tunneling barrier layer 420. The tunneling barrier layer 420 may have a thickness that is less than or equal to about 100 nm. For example, the thickness of the tunneling barrier layer 420 may be about 1 nm to about 10 nm. When a thickness of the tunneling barrier layer 420 is too small, heat may not stay in the magnetic resistance device 400 for a required duration of time. When a thickness of the tunneling barrier layer 420 is too large, electrons may have difficulty tunneling the tunneling barrier layer 420.

For example, the magnetic resistance device 400 may include additional layers for various purposes. For example, the magnetic resistance device 400 may further include a heat conduction control layer (for example, an oxide-based layer, such as an $Al_2O_3$ layer, an $SiO_2$ layer, or a $TiO_2$ layer) having a low heat conductivity in order for heat to sufficiently stay in the magnetic resistance device 400 and may further include a layer (for example, a layer including an non-magnetic material (for example, platinum manganese (PtMn) or iridium manganese (IrMn))) to further enhance the effect of pinning the magnetization direction of the first magnetic layer 410. The layer for further enhancing the effect of pinning the magnetization direction of the first magnetic layer 410 may be provided between the first magnetic layer 410 and a first conductive line 314 described below.

The first conductive line 314 may be provided on the lower insulating layer 210. The first conductive line 314 may extend along an upper surface of the lower insulating layer 210. The first conductive line 314 may extend from an area between the magnetic resistance device 400 and the lower insulating layer 210 to an area overlapping the first pad 122 in the third direction DR3. FIG. 2 illustrates that the first conductive line 314 extends in the first direction DR1, but embodiments are not limited thereto. The extension direction or shape of the first conductive line 314 may be determined according to a relative location between the magnetic resistance device 400 and the first pad 122. The first conductive line 314 may include an electrically conductive material. For example, the conductive line 314 may include at least one of TiN, Pt, Pd, W, Ti, Al, Ni, a NiCr alloy, Cu, and Au. The first conductive line 314 may be electrically connected to the magnetic resistance device 400. For example, the first conductive line 314 may directly contact the first magnetic layer 410. For example, a first electrode may be arranged between the first magnetic layer 410 and the lower insulating layer 210, and the first conductive line 314 may be electrically connected to the first electrode.

A first via 312 may be provided between the first conductive line 314 and the first pad 122. The first via 312 may penetrate the lower insulating layer 210. For example, the first via 312 may extend in the third direction DR3. The first via 312 may include an electrically conductive material. For example, the first via 312 may include at least one of TiN, Pt, Pd, W, Ti, Al, Ni, a NiCr alloy, Cu, and Au. The first via 312 may be electrically connected to the first pad 122 and the first conductive line 314. For example, the first via 312 may directly contact the first pad 122 and the first conductive line 314.

An upper insulating layer 220 may be provided on the lower insulating layer 210. The upper insulating layer 220 may be provided adjacent to and surround a side surface of the magnetic resistance device 400. The upper insulating layer 220 may have a thickness that is less than or equal to about 0.1 μm. For example, the upper insulating layer 220 may have substantially the same thickness as the magnetic resistance device 400. The upper insulating layer 220 may prevent or reduce excessively quick emission of heat from the magnetic resistance device 400. For example, the upper insulating layer 220 may be configured in order for the heat to sufficiently stay in the magnetic resistance device 400. The upper insulating layer 220 may expose an upper portion of the magnetic resistance device 400. For example, an upper surface of the upper insulating layer 220 may be co-planar with an upper surface of the magnetic resistance device 400. The upper insulating layer 220 may cover the first conductive line 314. The upper insulating layer 220 may include an insulating material. For example, the upper insulating layer 220 may include an oxide, a nitride, or a combination thereof. For example, the upper insulating layer 220 may include at least one of $SiO_2$, $Al_2O_3$, $HfO_2$, and $Si_xN_y$.

A second conductive line 316 may be provided on the upper insulating layer 220. The second conductive line 316 may extend along an upper surface of the upper insulating layer 220. The second conductive line 316 may extend from an area on the magnetic resistance device 400 to an area overlapping the second pad 124 in the third direction DR3. FIG. 2 illustrates that the second conductive line 316 extends in the first direction DR1, but embodiments are not limited thereto. The extension direction or shape of the second conductive line 316 may be determined according to a relative location between the magnetic resistance device 400 and the second pad 124. The second conductive line 316 may include an electrically conductive material. For example, the second conductive line 316 may include at least one of TiN, Pt, Pd, W, Ti, Al, Ni, a NiCr alloy, Cu, and Au. The second conductive line 316 may be electrically connected to the magnetic resistance device 400. For example, a second electrode may be provided on the second magnetic layer 430, and the second conductive line 316 may be electrically connected to the second electrode.

A second via 318 may be provided between the second conductive line 316 and the second pad 124. The second via 318 may penetrate the upper insulating layer 220 and the lower insulating layer 210. For example, the second via 318 may extend in the third direction DR3. The second via 318 may include an electrically conductive material. For example, the second via 318 may include at least one of TiN, Pt, Pd, W, Ti, Al, Ni, a NiCr alloy, Cu, and Au. The second via 318 may be electrically connected to the second pad 124 and the second conductive line 316. For example, the second via 318 may directly contact the second pad 124 and the second conductive line 316.

An LWIR absorption layer 500 may be provided on the upper insulating layer 220. The LWIR absorption layer 500 may cover the second conductive line 316. The LWIR absorption layer 500 may absorb LWIR rays and generate heat. For example, the LWIR absorption layer 500 may include a SiNx layer, a NiCr layer, and a SiNx layer sequentially stacked in a direction away from the upper insulating layer 220. For example, thicknesses of the SiNx layer and the NiCr layer that are adjacent to the upper insulating layer 220 may be about 0.08 μm and about 0.01 μm, respectively, and a thickness of the SiNx layer that is relatively far from the upper insulating layer 220 may be about 0.2 μm.

A transmissive cap 600 may be provided on the passivation layer 110. An inner area surrounded by and provided adjacent to the transmissive cap 600 and the passivation layer 110 may be formed. For example, the inner area 602 may be an area encapsulated by the transmissive cap 600 and the substrate 100. An air pressure of the inner area 602 may be lower than an air pressure outside the transmissive cap 600. For example, the inner area 602 may have a substantially vacuum state. The lower insulating layer 210, the upper insulating layer 220, and the LWIR absorption layer 500 may be provided in the inner area 602. The transmissive cap 600 may cover the lower insulating layer 210, the upper insulating layer 220, and the LWIR absorption layer 500. The transmissive cap 600 may be spaced apart from the lower insulating layer 210, the upper insulating layer 220, and the LWIR absorption layer 500. The transmissive cap 600 and the passivation layer 110 may contact each other. For example, to fix the transmissive cap 600 on the passivation layer 110, an adhesion material may be provided between a lower surface of the transmissive cap 600 and an upper surface of the passivation layer 110, the lower surface of the transmissive cap 600 and the upper surface of the passivation layer 110 being directly adjacent to each other. For example, the transmissive cap 600 may penetrate the passivation layer 110 and may contact the substrate 100. The transmissive cap 600 may be configured to selectively transmit LWIR rays from light that is incident into the transmissive cap 600. For example, the transmissive cap 600 may receive incident light L1 and emit LWIR rays into the inner area 602. The transmissive cap 600 may include a material or a structure to selectively transmit the LWIR rays. For example, the transmissive cap 600 may include calcium fluoride (CaF$_2$), Si, germanium (Ge), gallium arsenide (GaAs), thallium bromoiodide (KRS-5), zinc sulfide (ZnS), zinc selenide (ZnSe), barium fluoride (BaF$_2$), or an infrared (IR) polymer. A distance between the transmissive cap 600 and the LWIR absorption layer 500 may be determined as needed. For example, the transmissive cap 600 may be spaced apart from the LWIR absorption layer 500 by about 100 nm to about 2 μm.

Hereinafter, a method of sensing the LWIR rays is described.

Figure 3:
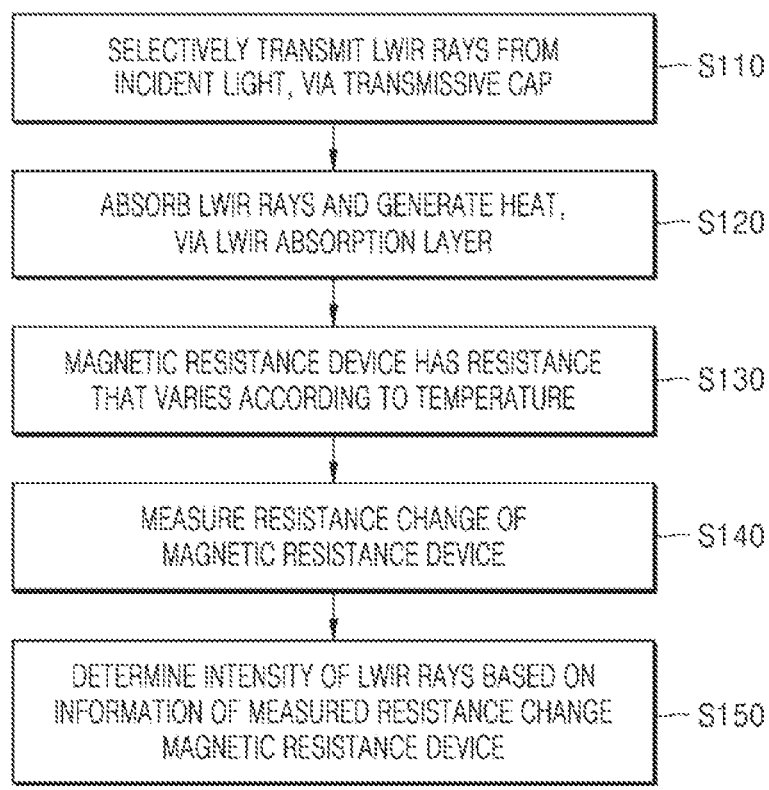
FIG. 3 is a flowchart of a method of sensing LWIR rays, performed by the LWIR sensor of FIG. 1.
Figure 4:
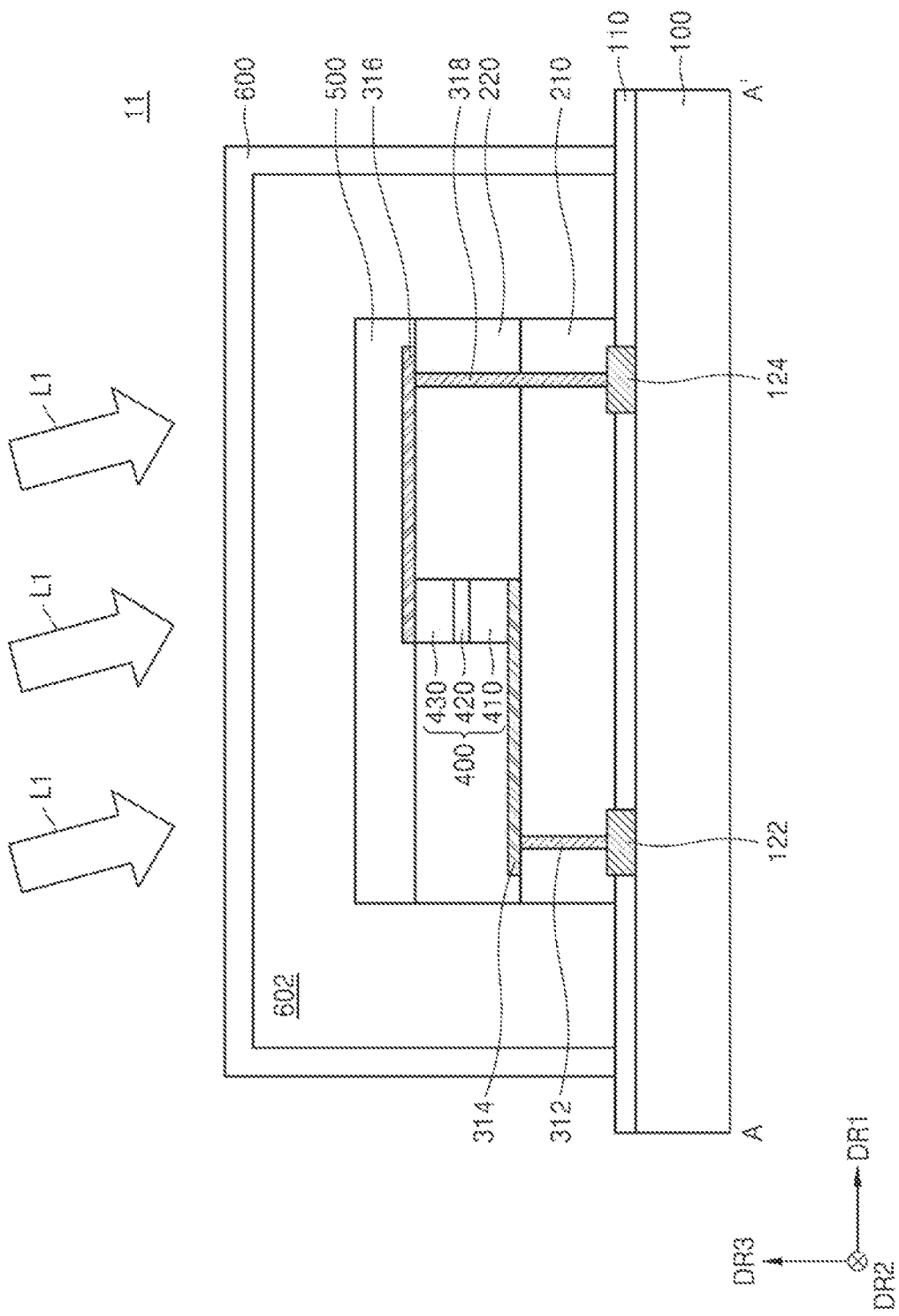
FIGS. 4, 5, and 6 are cross-sectional views of an LWIR sensor taken along line A-A' of FIG. 1, for describing the method of sensing the LWIR rays of FIG. 3.
Figure 5:
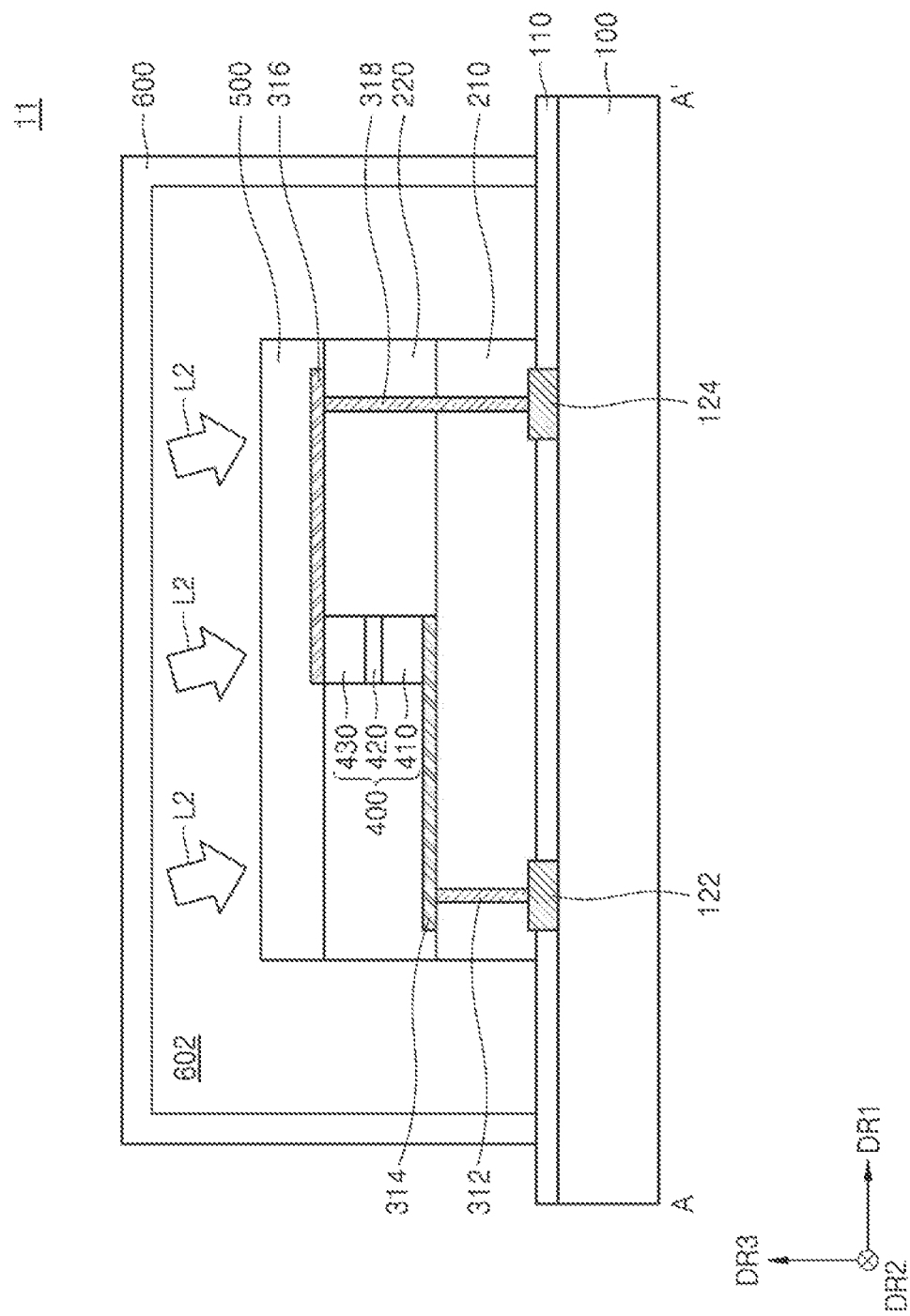
Figure 6:
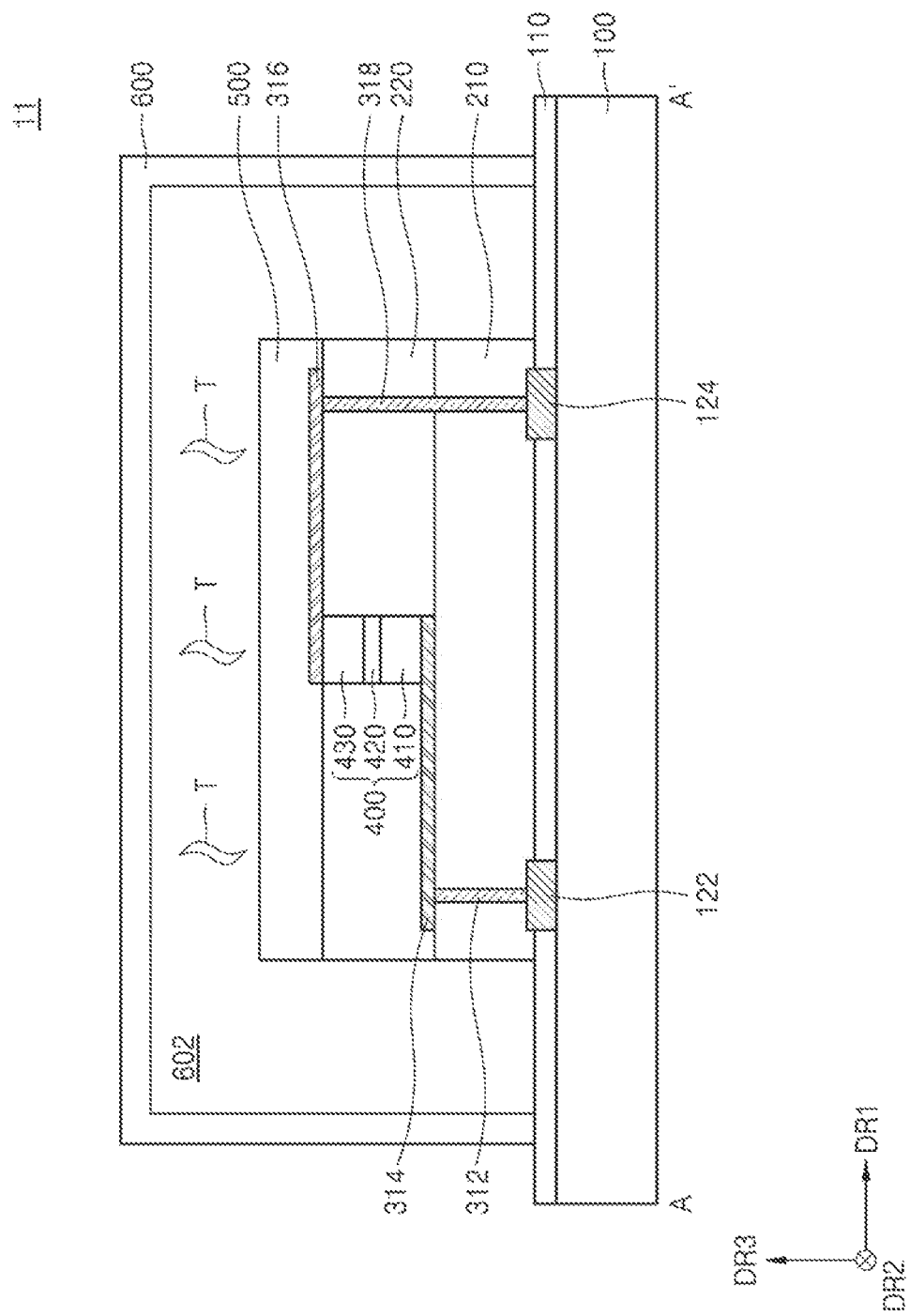

FIG. 3 is a flowchart of a method of sensing LWIR rays, performed by the LWIR sensor 11 of FIG. 1. FIGS. 4 through 6 are cross-sectional views of the LWIR sensor 11 taken along line A-A' of FIG. 1, for describing the method of sensing the LWIR rays of FIG. 3.

Referring to FIGS. 3 through 5, the transmissive cap 600 may receive incident light L1. For example, the incident light L1 may include LWIR rays L2. The transmissive cap 600 may selectively transmit the LWIR rays L2 from the incident light L1 (S110). The LWIR rays L2 may reach the LWIR absorption layer 500.

Referring to FIGS. 3 and 6, the LWIR absorption layer 500 may absorb the LWIR rays L2 and generate heat T (S120). The heat T generated by the LWIR absorption layer 500 may vary according to an intensity of the LWIR rays L2. The heat T generated by the LWIR absorption layer 500 may be transferred to the magnetic resistance device 400. Thus, a temperature of the magnetic resistance device 400 may rise.

An average resistance ⟨R$_T$⟩ according to the temperature of the magnetic resistance device 400 may be represented by the following [Equation 1].

$$\langle R_T \rangle = \frac{\tau_P R_P + \tau_{AP} R_{AP}}{\tau_P + \tau_{AP}} \quad \text{[Equation 1]}$$

Here, T$_P$ is an average time during which the magnetic resistance device 400 has a parallel state, T$_{AP}$ is an average time during which the magnetic resistance device 400 has an anti-parallel state, R$_P$ is a resistance of the magnetic resistance device 400 in the parallel state, and R$_{AP}$ is a resistance of the magnetic resistance device 400 in the anti-parallel state.

R$_P$ is less than R$_{AP}$. R$_P$ and R$_{AP}$ may not change according to the temperature. When the magnetic resistance device 400 has a high thermal stability (for example, a thermal stability that is greater than 40), T$_P$ and T$_{AP}$ are substantially the same as each other regardless of the temperature. The magnetic resistance device 400 according to an example embodiment has a low thermal stability (for example, a thermal stability that is less than 10), and thus, as the magnetic resistance device 400 has an increased temperature, T$_P$ may increase, and T$_{AP}$ may decrease in [Equation 1]. Based on a reference temperature at which T$_P$ and T$_{AP}$ overlap each other, T$_P$ is less than T$_{AP}$ at a temperature below the reference temperature, and T$_{AP}$ is less than T$_P$ at a temperature above the reference temperature. Thus, the average resistance ⟨R$_T$⟩ of the magnetic resistance device 400 may decrease as the temperature of the magnetic resistance device 400 increases.

A predetermined voltage or current may be applied to the magnetic resistance device 400 by the ROIC including the electronic devices and the wires in the substrate 100. Before the heat T is transferred to the magnetic resistance device 400, the magnetic resistance device 400 may have a relatively low temperature. Here, T$_P$ may be less than T$_P$ at a higher temperature. Here, T$_{AP}$ may be greater than T$_{AP}$ at a higher temperature. Accordingly, the average resistance ⟨R$_T$⟩ of the magnetic resistance device 400 may be relatively greater compared with the average resistance ⟨R$_T$⟩ at a higher temperature.

The temperature of the magnetic resistance device 400 may rise due to the heat T provided to the magnetic resistance device 400. T$_P$ may increase, and T$_{AP}$ may decrease. Accordingly, as the temperature of the magnetic resistance device 400 increases, the average resistance ⟨R$_T$⟩ of the magnetic resistance device 400 may decrease. For example, the average resistance ⟨R$_T$⟩ of the magnetic resistance device 400 may be changed by the heat T provided to the magnetic resistance device 400 (S130).

The ROIC may measure a resistance change (that is, a change in average resistance ⟨R$_T$⟩) of the magnetic resistance device 400 (S140). According to an example embodiment, the ROIC may directly measure the resistance of the magnetic resistance device 400 by using a sensing current. For example, the ROIC may output and receive a sensing current transmitted through the magnetic resistance device 400 and may determine the resistance of the magnetic resistance device 400 based on received sensing current data. The ROIC may provide resistance change information of the magnetic resistance device 400 to a processor.

The processor may determine an intensity of the LWIR rays based on the resistance change information (S150). For example, the processor may derive the temperature of the magnetic resistance device 400 corresponding to the average resistance of the magnetic resistance device 400, may derive the amount of heat emitted from the LWIR absorption layer 500, based on the temperature, and then, may determine the intensity of the LWIR rays L2 for the amount of heat is to be emitted from the LWIR absorption layer 500.

A bolometer sensor having a micro-electro mechanical systems (MEMS) structure may include, for example, a VOx layer, a heat absorption layer on the VOx layer, and a pair of electrodes connected to the VOx layer and arranged on a same plane. When the heat absorption layer transfers heat to the VOx layer, a material property of the VOx layer may be changed. A value of the changed material property may be sensed by the pair of electrodes. Here, heat inside the bolometer sensor may rapidly escape through the pair of electrodes. Thus, the pair of electrodes may be formed to have a thin and long spring structure to increase the time during which the heat stays in the VOx layer. Accordingly, it may be difficult to miniaturize the bolometer sensor, and manufacture of the bolometer sensor may be complex. When the bolometer sensor is miniaturized through a space occupied by the electrodes having the spring structure, a ratio of a space occupied by the heat absorption layer in the bolometer sensor may be decreased.

The second conductive line 316, the magnetic resistance device 400, and the first conductive line 314 may be sequentially arranged on the LWIR absorption layer 500 in a direction toward the substrate 100. A heat channel transferring the heat generated in the LWIR absorption layer 500 may pass through the magnetic resistance device 400. The tunneling barrier layer 420 may have a low heat transferring efficiency. Thus, the tunneling barrier layer 420 according to the example embodiment may prevent or reduce the heat from escaping at a higher speed than required by the magnetic resistance device 400. For example, the tunneling barrier layer 420 may be configured such that the heat may sufficiently stay in the magnetic resistance device 400. A thickness of the tunneling barrier layer 420 may be appropriately determined as needed. The magnetic resistance device 400 may further include an additional heat transfer control layer as needed. In addition, according to the example embodiment, even when the LWIR sensor 11 is miniaturized, a ratio of a space occupied by the LWIR absorption layer 500 may not be decreased. Thus, the LWIR sensor 11 that is small-sized while maintaining the high efficiency may be provided.

Figure 7:
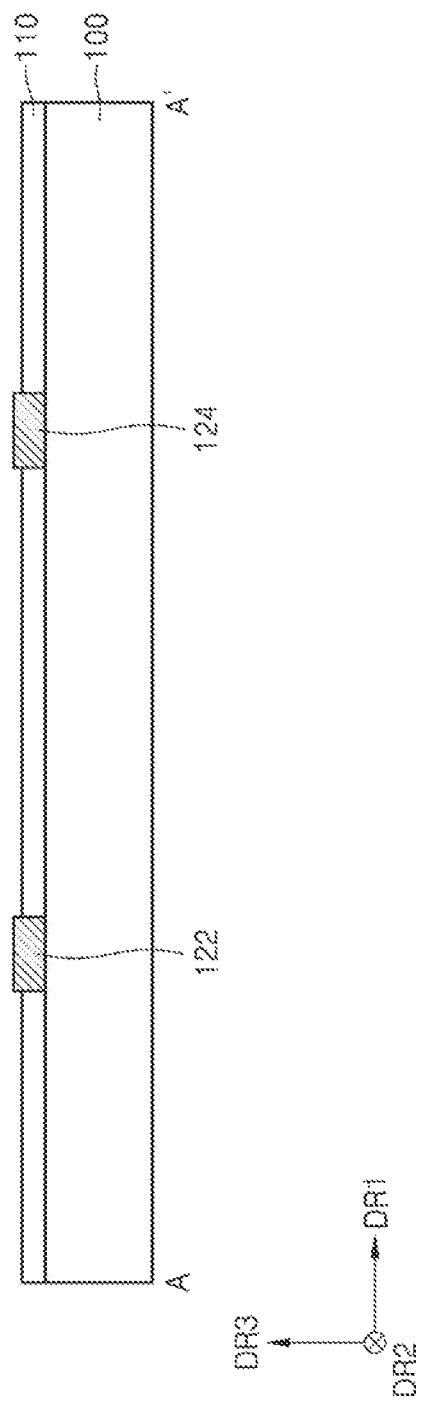
FIGS. 7, 8, and 9 are cross-sectional views of an LWIR sensor taken along line A-A' of FIG. 1, for describing a method of manufacturing the LWIR sensor of FIG. 1.
Figure 8:
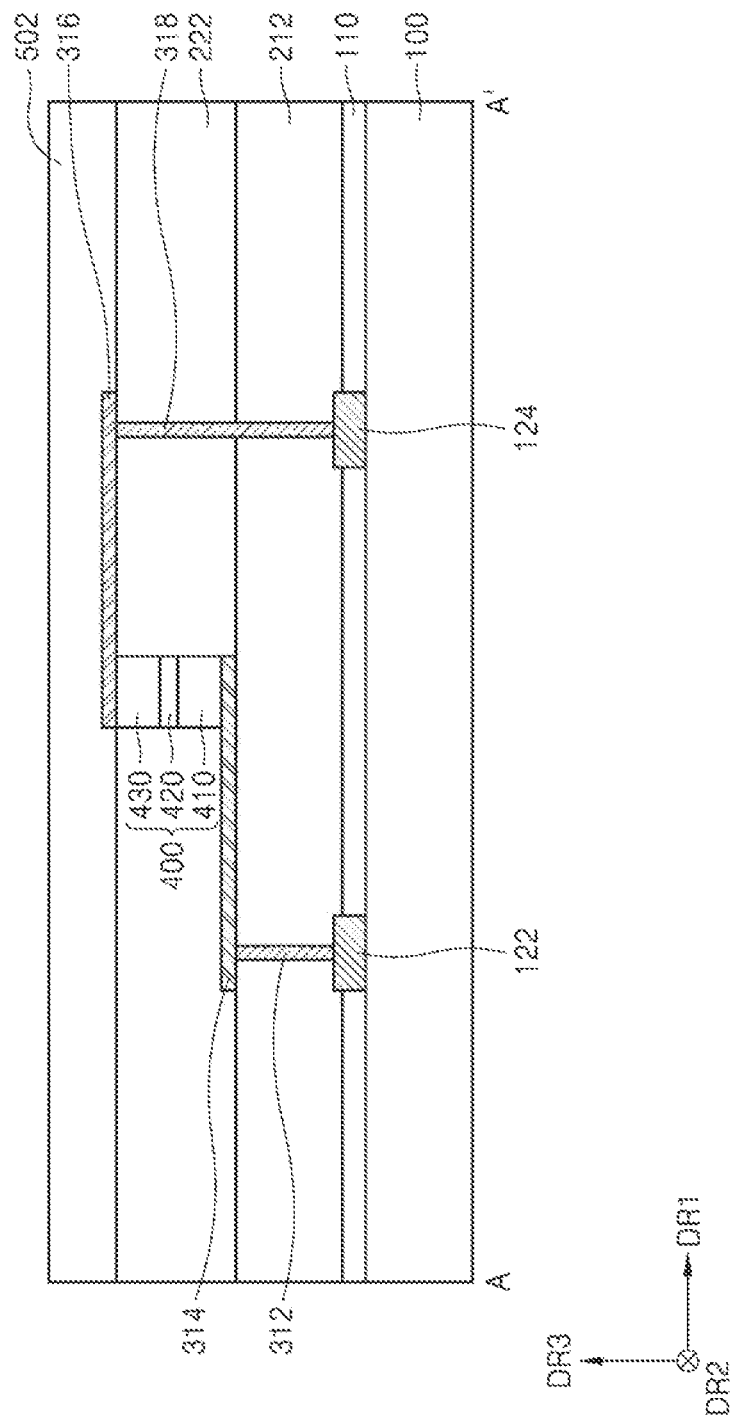
Figure 9:
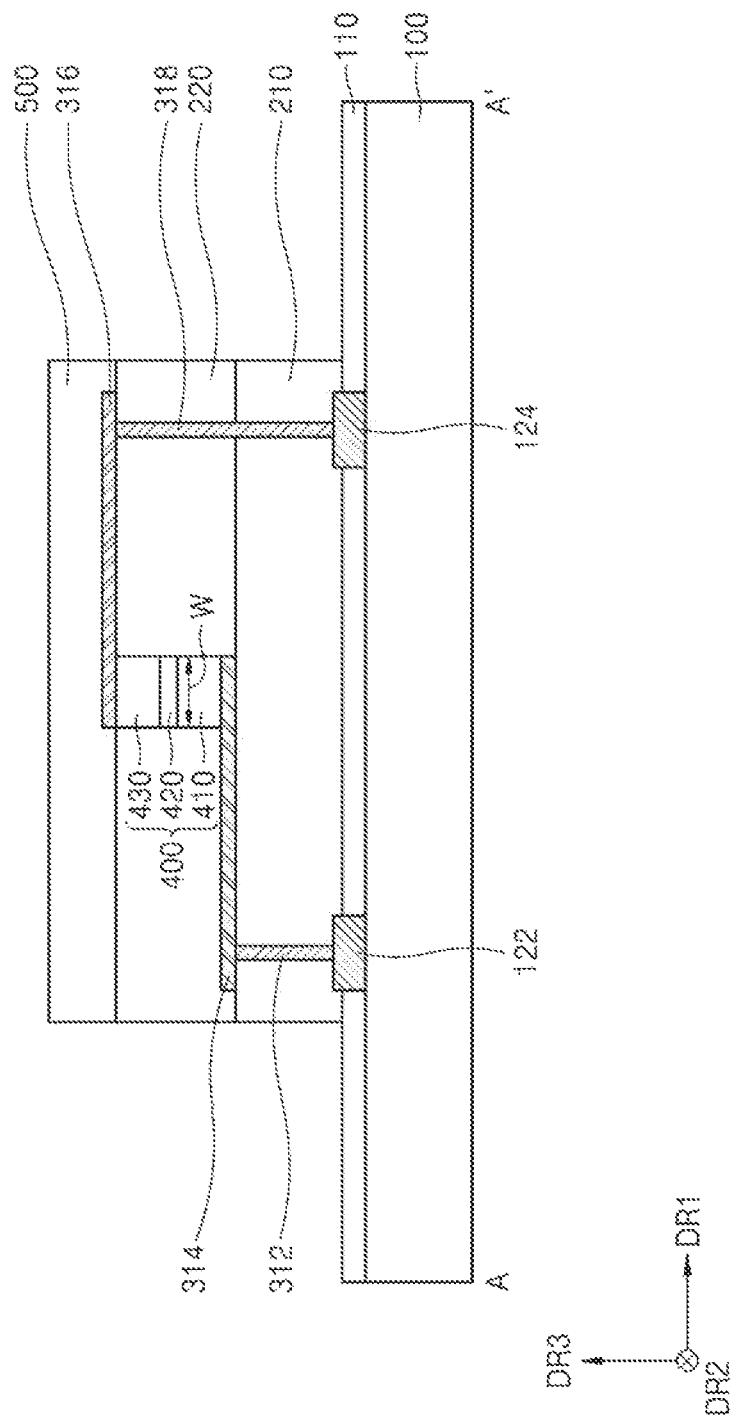

FIGS. 7 through 9 are cross-sectional views of the LWIR sensor 11 taken along line A-A' of FIG. 1, for describing a method of manufacturing the LWIR sensor 11 of FIG. 1. For brevity of explanation, aspects that are substantially the same as the aspects described with reference to FIGS. 1 and 2 may not be described.

Referring to FIG. 7, the passivation layer 110, the first pad 122, and the second pad 124 may be formed on the substrate 100. For example, the passivation layer 110 may be formed by a process of depositing an insulating material on the substrate 100. The insulating material may be substantially the same as the material of the passivation layer described with reference to FIGS. 1 and 2.

The passivation layer 110 may be patterned, and a pair of openings may be formed in the passivation layer 110. The pair of openings may penetrate the passivation layer 110 and expose the substrate 100. The pair of openings may be spaced apart from each other in a first direction DR1.

The first pad 122 and the second pad 124 may be formed in the pair of openings, respectively. For example, the forming of the first pad 122 and the second pad 124 may include forming an electrically conductive material layer on the passivation layer 110 and then patterning the electrically conductive material layer. The electrically conductive material layer may include substantially the same material as the first pad 122 and the second pad 124 described with reference to FIGS. 1 and 2.

Referring to FIG. 8, a preliminary lower insulating layer 212 may be formed on the passivation layer 110. For example, the preliminary lower insulating layer 212 may be formed by a process of depositing an insulating material on the substrate 100. The insulating material may be substantially the same as the material of the lower insulating layer 210 described with reference to FIGS. 1 and 2.

The first via 312 and the first conductive line 314 may be formed in the preliminary lower insulating layer 212. For example, the first via 312 and the first conductive line 314 may be formed by forming a via hole penetrating the preliminary lower insulating layer 212 and exposing the first pad 122, depositing an electrically conductive material on the preliminary lower insulating layer 212 to fill the via hole and to cover an upper surface of the preliminary lower insulating layer 212, and then, patterning the deposited electrically conductive material. The electrically conductive material may be substantially the same as the material of the first via 312 and the first conductive line 314 described with reference to FIGS. 1 and 2.

The magnetic resistance device 400 may be formed on the first conductive line 314. For example, the magnetic resistance device 400 may be formed by sequentially depositing a first preliminary magnetic layer, a preliminary tunneling barrier layer, and a second preliminary magnetic layer, and then, patterning the first preliminary magnetic layer, the preliminary tunneling barrier layer, and the second preliminary magnetic layer. The patterned first preliminary magnetic layer, preliminary tunneling barrier layer, and second preliminary magnetic layer may be the first magnetic layer 410, the tunneling barrier layer 420, and the second magnetic layer 430, respectively. The first preliminary magnetic layer, the preliminary tunneling barrier layer, and the second preliminary magnetic layer may respectively include substantially the same material as the first magnetic layer 410, the tunneling barrier layer 420, and the second magnetic layer 430 described with reference to FIGS. 1 and 2. The magnetic resistance device 400 may extend on the first conductive line 314 in a third direction DR3.

A preliminary upper insulating layer 222 may be formed on the preliminary lower insulating layer 212. For example, the preliminary upper insulating layer 222 may be formed by a process of depositing an insulating material on the substrate 100. The insulating material may be substantially the same as the material of the upper insulating layer 220 described with reference to FIGS. 1 and 2. The preliminary upper insulating layer 222 may cover the first conductive line 314 and surround a side surface of the magnetic resistance device 400.

The second via 318 may be formed on the preliminary lower insulating layer 212 and the preliminary upper insulating layer 222, and the second conductive line 316 may be formed on the preliminary upper insulating layer 222. For example, the second via 318 and the second conductive line 316 may be formed by forming a via hole penetrating the preliminary upper insulating layer 222 and the preliminary lower insulating layer 212 and exposing the second pad 124, depositing an electrically conductive material on the preliminary upper insulating layer 222 to fill the via hole and cover an upper surface of the preliminary upper insulating layer 222, and then, patterning the deposited electrically conductive material. The electrically conductive material may be substantially the same as the material of the second via 318 and the second conductive line 316 described with reference to FIGS. 1 and 2.

A preliminary LWIR absorption layer 500 may be formed on the preliminary upper insulating layer 222. For example, the preliminary LWIR absorption layer 502 may be formed by sequentially depositing a SiNx layer, a NiCr layer, and a SiNx layer on the preliminary upper insulating layer 222. The preliminary LWIR absorption layer 502 may cover the second conductive line 316.

Referring to FIG. 9, the preliminary LWIR absorption layer 502, the preliminary upper insulating layer 222, and the preliminary lower insulating layer 212 may be patterned to form the LWIR absorption layer 500, the upper insulating layer 220, and the lower insulating layer 210, respectively. For example, the patterning of the preliminary LWIR absorption layer 502, the preliminary upper insulating layer 222, and the preliminary lower insulating layer 212 may include performing an anisotropic etching process using a patterning mask arranged on the preliminary LWIR absorption layer 502. The patterning of the preliminary LWIR absorption layer 502, the preliminary upper insulating layer 222, and the preliminary lower insulating layer 212 may be performed until the passivation layer 110 is exposed.

Referring to FIG. 2, the transmissive cap 600 may be formed on the passivation layer 110. For example, the transmissive cap 600 may adhere to the passivation layer 110 after an adhesion material is applied on a lower surface of the transmissive cap 600. The transmissive cap 600 may be substantially the same as the transmissive cap 600 described with reference to FIGS. 1 and 2.

According to the example embodiment, the method of manufacturing the LWIR sensor 11, the method using a semiconductor process, is provided, and thus, compared to a method of manufacturing an LWIR sensor having a MEMS structure, the method according to the example embodiment may have improved compatibility with a general semiconductor process, have a less difficult manufacturing process, and have reduced manufacturing time and costs.

Figure 10:
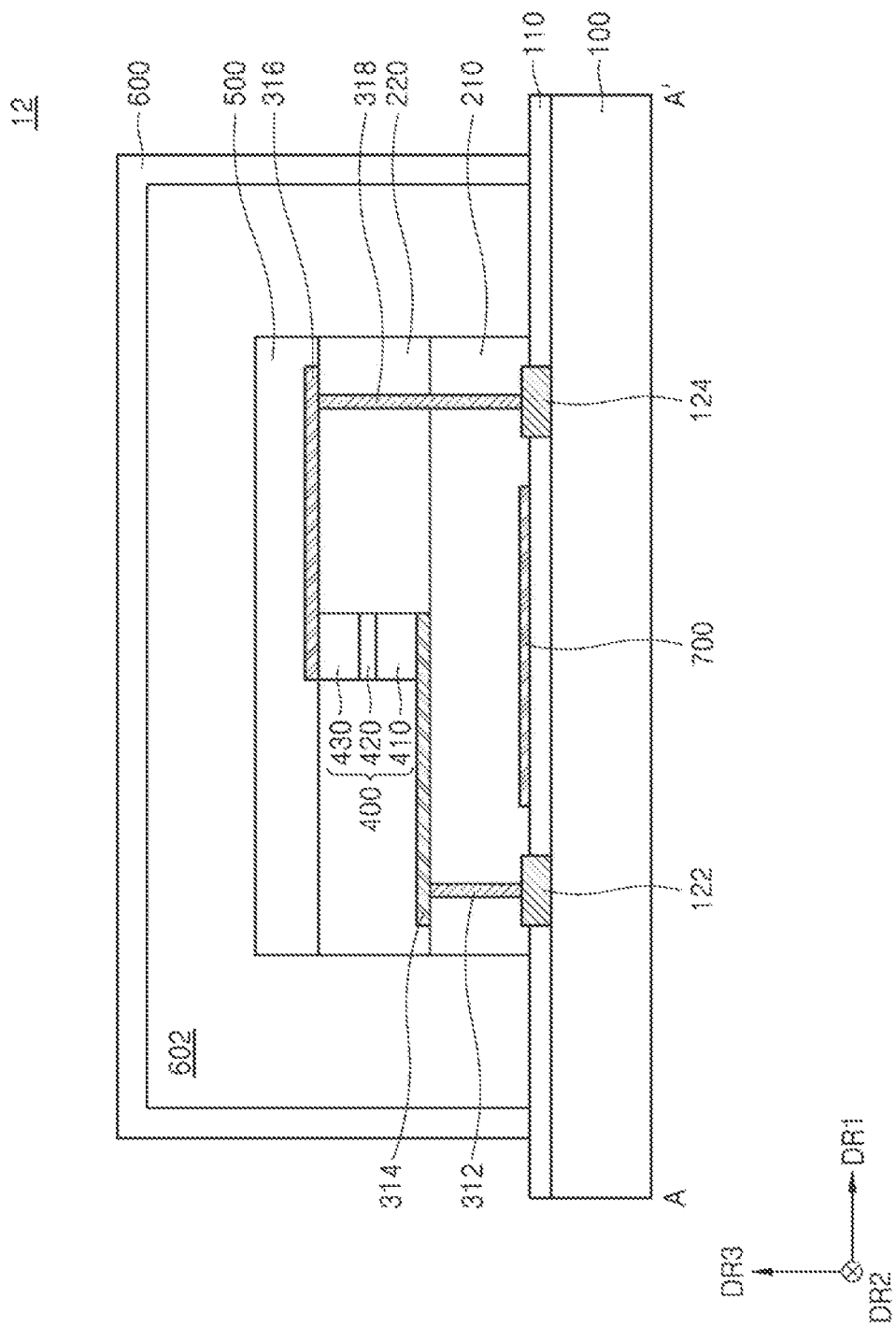
FIG. 10 is a cross-sectional view of an LWIR sensor taken along line A-A' of FIG. 1, according to an example embodiment.

FIG. 10 is a cross-sectional view of an LWIR sensor 12 taken along line A-A' of FIG. 1, according to an example embodiment. For brevity of explanation, aspects that are substantially the same as the aspects described with reference to FIGS. 1 and 2 may not be described.

Referring to FIG. 10, the LWIR sensor 12 may be provided. The LWIR sensor 12 may further include a reflective layer 700 in the LWIR sensor 11 described with reference to FIGS. 1 and 2. The reflective layer 700 may overlap the magnetic resistance device 400 in a third direction DR3. The reflective layer 700 may be arranged between the passivation layer 110 and the lower insulating layer 210. The reflective layer 700 may include a metal. For example, the reflective layer 700 may include at least one of Mo, Al, and Cu. For example, the reflective layer 700 may include substantially the same material as the first pad 122 and the second pad 124. For example, the reflective layer 700 may be formed together with the first pad 122 and the second pad 124, when the first pad 122 and the second pad 124 are formed.

The reflective layer 700 may reflect LWIR rays transmitted through the LWIR absorption layer 500, the upper insulating layer 220, and the lower insulating layer 210 and reaching the reflective layer 700. The LWIR rays reflected from the reflective layer 700 may be provided again to the LWIR absorption layer 500. The LWIR absorption layer 500 may receive the reflected LWIR rays and generate heat. The LWIR absorption layer may generate more heat than when there is no reflective layer 700. The amount of a resistance change of the magnetic resistance device 400 may relatively increase. Thus, a sensing sensitivity of the LWIR sensor 12 may improve.

Figure 11:
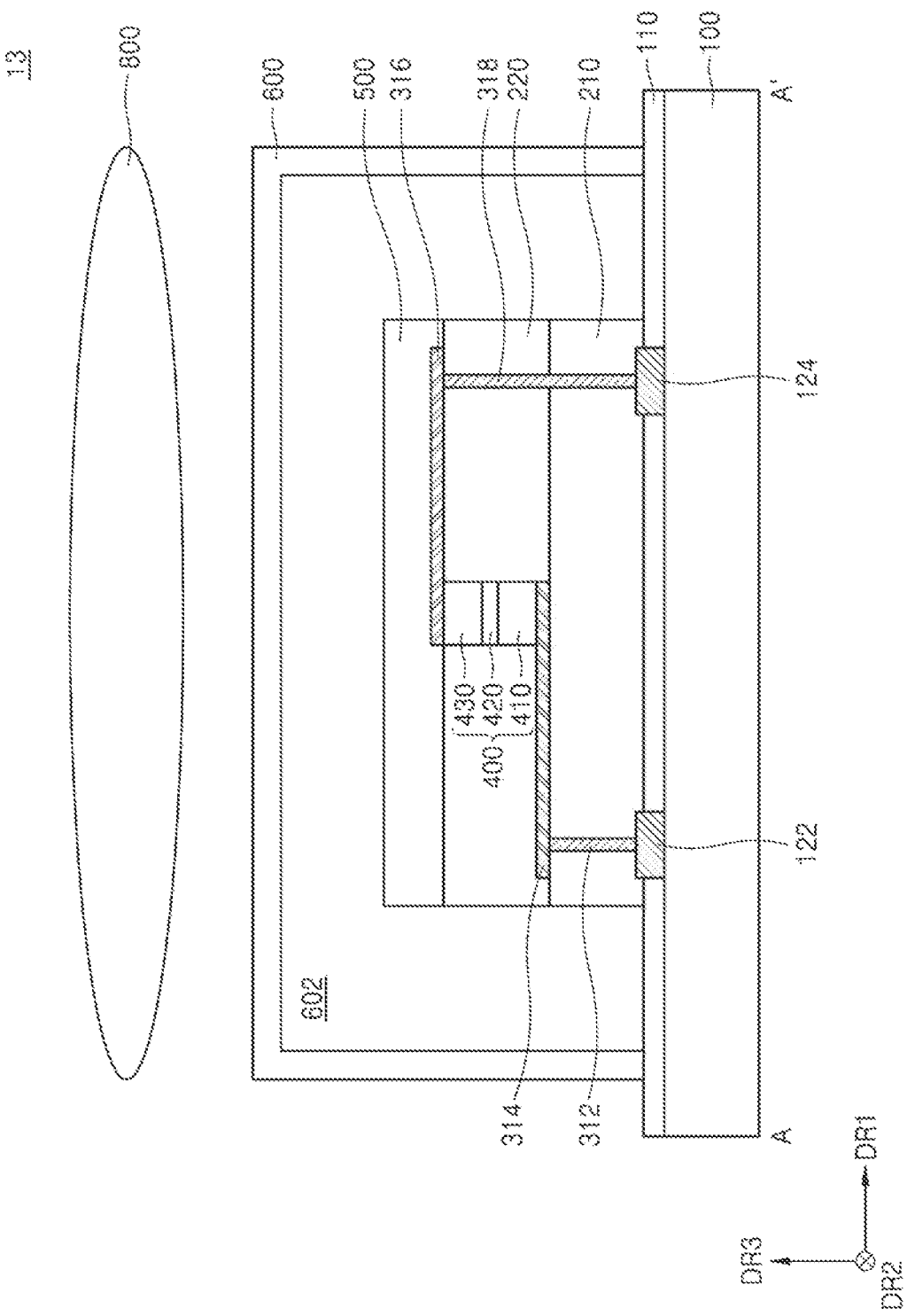
FIG. 11 is a cross-sectional view of an LWIR sensor taken along line A-A' of FIG. 1, according to an example embodiment.

FIG. 11 is a cross-sectional view of an LWIR sensor 13 taken along line A-A' of FIG. 1, according to an example embodiment. For brevity of explanation, aspects that are substantially the same as the aspects described with reference to FIGS. 1 and 2 may not be described.

Referring to FIG. 11, the LWIR sensor 13 may be provided. The LWIR sensor 13 may further include a focusing lens 800 in the LWIR sensor 11 described with reference to FIGS. 1 and 2. The focusing lens 800 may be arranged outside the transmissive cap 600. The focusing lens 800 may include a light-transmissive material. For example, the focusing lens 800 may include Si, $SiO_x$, Ge, or a Ge compound. For example, the focusing lens 800 may include a structure or a material selectively transmitting LWIR rays. In this case, unlike what is described with reference to FIGS. 1 and 2, the transmissive cap 600 may not be limited to selectively transmitting the LWIR rays. For example, when the focusing lens 800 is configured to selectively transmit the LWIR rays, the transmissive cap 600 may be configured to transmit light including the LWIR rays.

The focusing lens 800 may focus incident light to the LWIR absorption layer 500. Because more incident light than when the focusing lens 800 is not provided reaches the LWIR absorption layer, the LWIR absorption layer 500 may generate relatively more heat. The amount of a resistance change of the magnetic resistance device 400 may relatively increase. Thus, a sensing sensitivity of the LWIR sensor 13 may improve.

Figure 12:
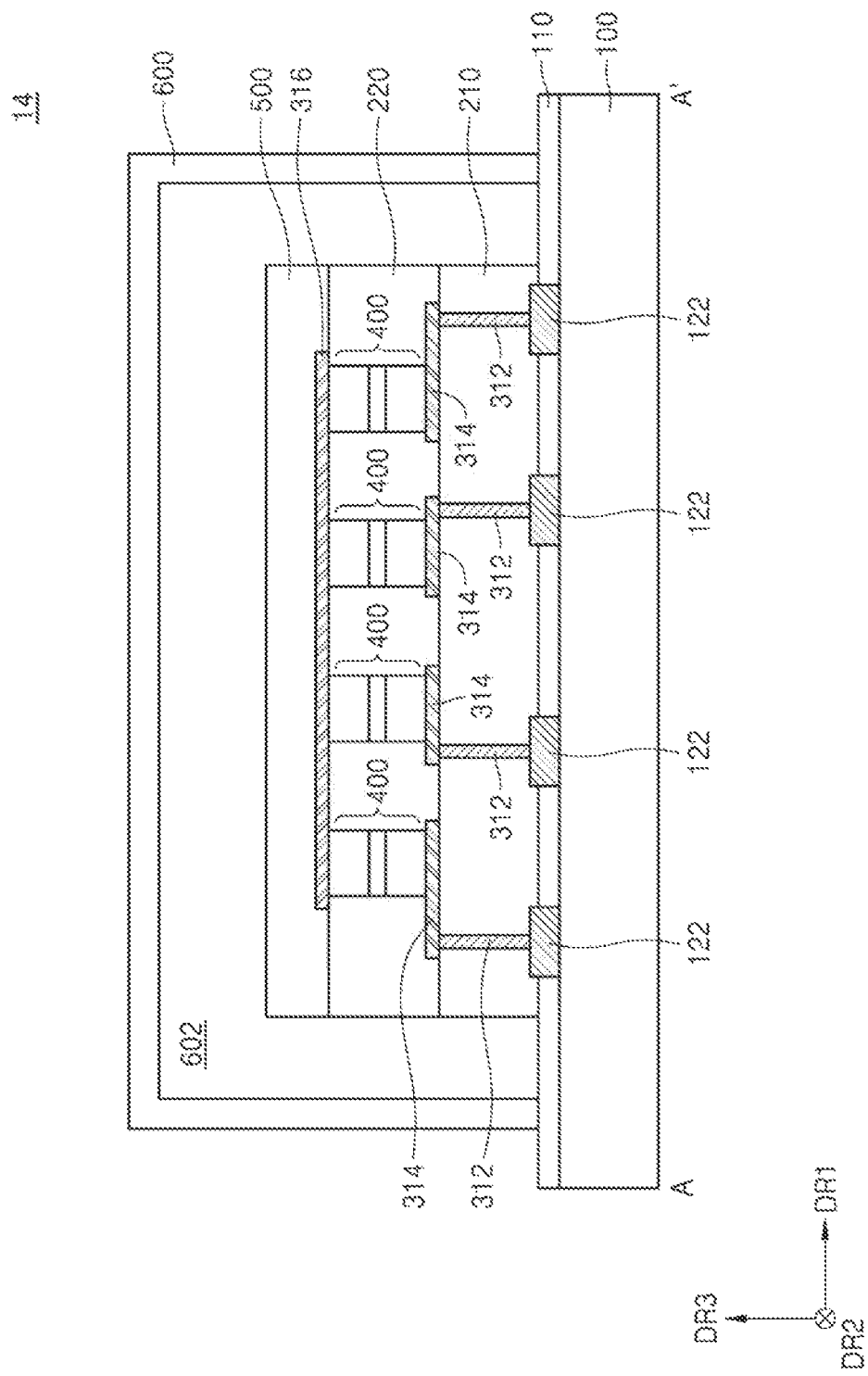
FIG. 12 is a cross-sectional view of an LWIR sensor taken along line A-A' of FIG. 1, according to an example embodiment.

FIG. 12 is a cross-sectional view of an LWIR sensor 14 taken along line A-A' of FIG. 1, according to an example embodiment. For brevity of explanation, aspects that are substantially the same as the aspects described with reference to FIGS. 1 and 2 may not be described.

Referring to FIG. 12, the LWIR sensor 14 may be provided. The LWIR sensor 14 may include a multiple number of each of the magnetic resistance device 400, the first pad 122, the first via 312, and the first conductive line 314 that are provided in the LWIR sensor 11 described with reference to FIGS. 1 and 2. Four magnetic resistance devices 400, four first pads 122, four first vias 312, and four first conductive lines 314 are illustrated, but embodiments are not limited thereto. As another example, two, three, five, or more magnetic resistance devices 400, first pads 122, first vias 312, and first conductive lines 314 may be provided.

FIG. 12 illustrates that the four magnetic resistance devices 400 are arranged in a first direction DR1, but embodiments are not limited thereto. For example, the plurality of magnetic resistance devices 400 may be arranged in an M×N form in the first direction DR1 and a second direction DR2. The plurality of magnetic resistance devices 400 may be included in one pixel.

For example, different voltages or currents may be applied to the plurality of magnetic resistance devices 400.

For example, the same voltage or current may be applied to the plurality of magnetic resistance devices 400. FIG. 12 illustrates that the plurality of magnetic resistance devices 400 are electrically connected to the plurality of first conductive lines 314, respectively. However, embodiments are not limited thereto. As another example, the plurality of magnetic resistance devices 400 may be electrically connected to one first conductive line 314, and one first via 312 and one first pad 122 may be arranged to correspond to one first conductive line 314.

For example, the reflective layer 700 described with reference to FIG. 10 may further be provided between the plurality of magnetic resistance devices 400 and the passivation layer 110. The reflective layer 700 may overlap the plurality of magnetic resistance devices 400 in a third direction DR3. In this case, unlike what is illustrated in FIG. 12, the plurality of first vias 312 and the plurality of first pads 122 may be arranged outside an area overlapping the plurality of magnetic resistance devices 400 in the third direction DR3.

The LWIR sensor 14 according to the example embodiment may include the plurality of magnetic resistance devices 400, and thus, may have a relatively high sensing sensitivity.

Figure 13:
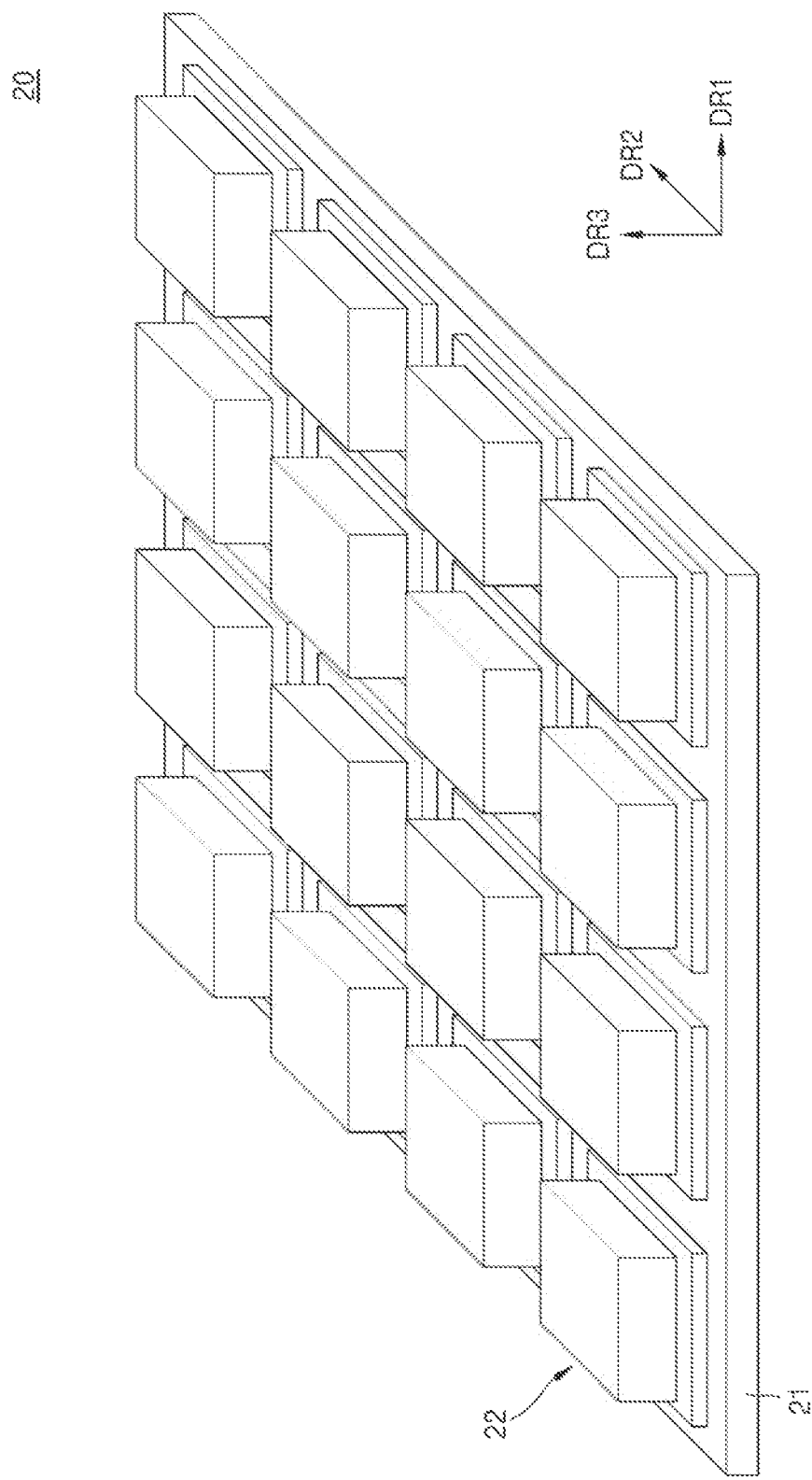
FIG. 13 is a perspective view of an LWIR sensor according to example embodiments.

FIG. 13 is a perspective view of an LWIR sensor 20 according to example embodiments. For brevity of explanation, aspects that are substantially the same as the aspects described above may not be described.

Referring to FIG. 13, the LWIR sensor 20 may be provided. The LWIR sensor 20 may include a base 21 and a plurality of sensors 22. The base 21 may be a package substrate including a plurality of wires. For example, the base 21 may be a printed circuit board (PCB). For example, a processor controlling the plurality of sensors 22 may be arranged in the base 21, and the plurality of wires may electrically connect the plurality of sensors 22 with the processor. For example, the processor controlling the plurality of sensors 22 may be provided outside the LWIR sensor 20, and the plurality of wires may electrically connect the plurality of sensors 22 with the processor outside the LWIR sensor 20.

The plurality of sensors 22 may be two-dimensionally arranged on the base 21. For example, the plurality of sensors 22 may be arranged in a first direction DR1 and a second direction DR2. Each of the plurality of sensors 22 may be substantially the same as the LWIR sensors 11, 12, 13, and 14 described above. For example, a plurality of solders may be provided between the plurality of sensors 22 and the base 21 to electrically connect the plurality of sensors 22 with the wires of the base 21 and make the plurality of sensors 22 adhere to the base 21. The plurality of sensors 22 may be separately controlled, and signals generated by the plurality of sensors 22 may be separately measured.

Figure 14:
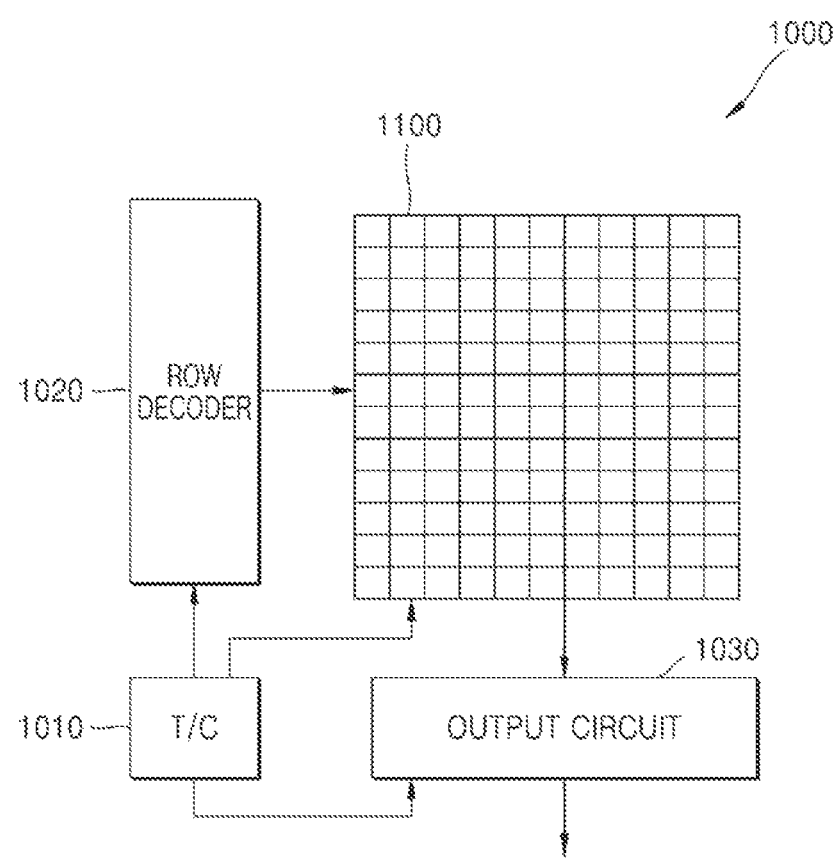
FIG. 14 is a block diagram of an LWIR sensor according to an example embodiment.

FIG. 14 is a schematic block diagram of an LWIR sensor 1000 according to an example embodiment.

Referring to FIG. 14, the LWIR sensor 1000 may include a pixel array 1100, a timing controller 1010, a row decoder 1020, and an output circuit 1030. The pixel array 1100 may include a plurality of pixels two-dimensionally arranged in a plurality of rows and a plurality of columns. Each of the plurality of pixels may include one of the LWIR sensors 11, 12, 13, and 14 described above. The LWIR sensors 11, 12, 13, and 14 may include the magnetic resistance device 400, and thus, the plurality of pixels may be miniaturized. The arrangement of the plurality of pixels may be implemented in various ways. For example, the plurality of pixels may be arranged in substantially the same way as the plurality of sensors 22 of the LWIR sensor 20 described with reference to FIG. 13. In this case, the plurality of rows may be virtual lines extending in a first direction DR1, and the plurality of columns may be virtual lines extending in a second direction DR2.

The row decoder 1020 may select one of the rows of a pixel array 1100 in response to a row address signal that is output from the timing controller 1010. The output circuit 1030 may output a light-sensing signal in a column unit from the pixel array 1100 arranged in the selected row. To this end, the output circuit 1030 may include a column decoder and an analog-to-digital converter (ADC). For example, the output circuit 1030 may include a plurality of ADCs respectively arranged in columns between the column decoder and the pixel array 1100 or one ADC arranged at an output end of the column decoder. The timing controller 1010, the row decoder 1020, and the output circuit 1030 may be implemented in one chip or in separate chips, respectively. A processor for processing an image signal that is output through the output circuit 1030 may be implemented in one chip together with the timing controller 1010, the row decoder 1020, and the output circuit 1030.

Figure 15:
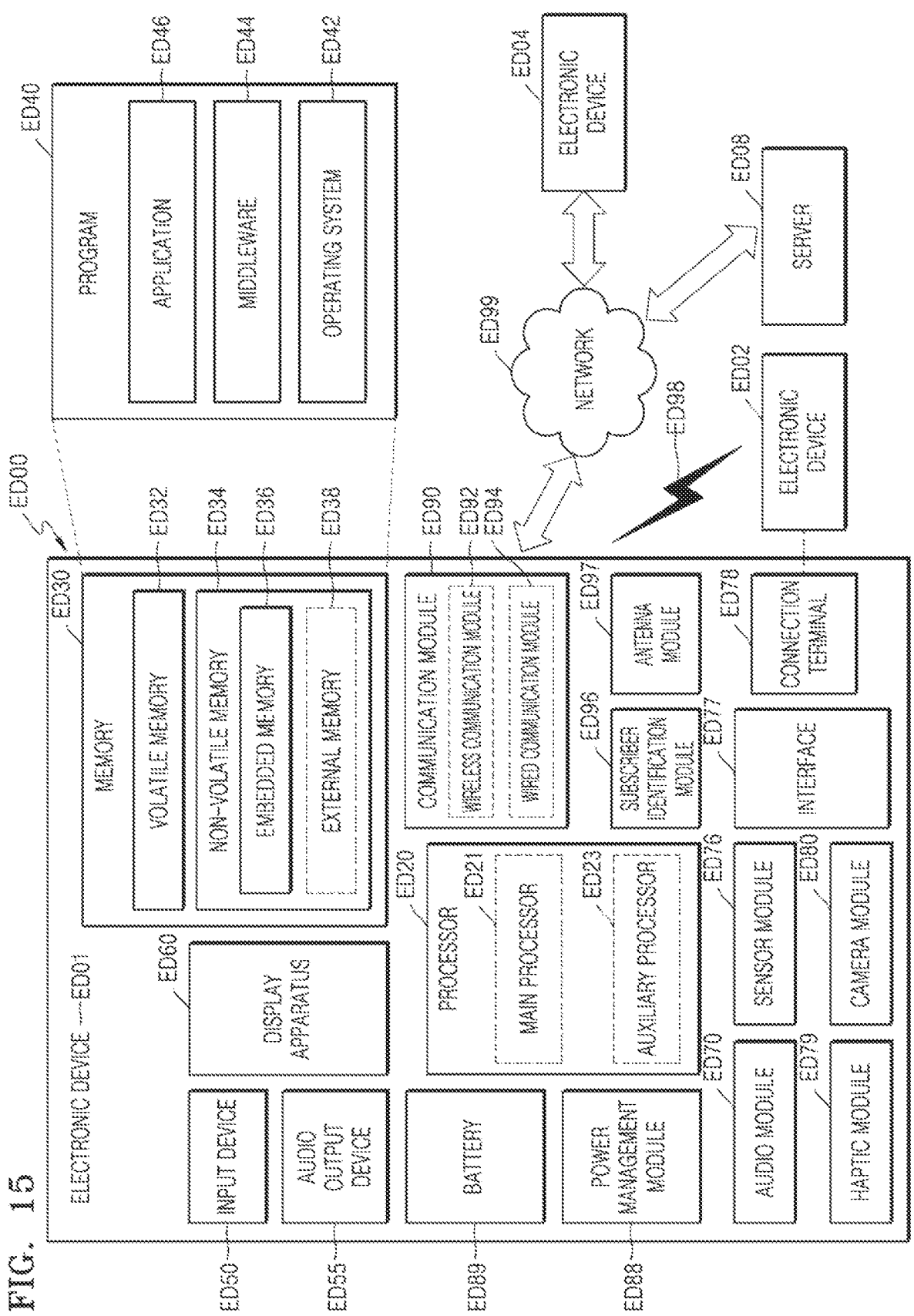
FIG. 15 is a block diagram of an example of an electronic device including an LWIR sensor according to example embodiments.

FIG. 15 is a block diagram of an example of an electronic device ED01 including an LWIR sensor according to example embodiments.

Referring to FIG. 15, in a network environment ED00, the electronic device ED01 may communicate with another electronic device ED02 through a first network ED98 (a short-range wireless communication network, etc.) or with another electronic device ED04 and/or a server ED08 through a second network ED99 (a remote wireless communication network, etc.). The electronic device ED01 may communicate with the electronic device ED04 through the server ED08. The electronic device ED01 may include a processor ED20, a memory ED30, an input device ED50, a sound output device ED55, a display apparatus ED60, an audio module ED70, a sensor module ED76, an interface ED77, a connection terminal ED78, a haptic module ED79, a camera module ED80, a power management module ED88, a battery ED89, a communication module ED90, a subscriber identification module ED96, and/or an antenna module ED97. The electronic device ED01 may omit one or more (the display apparatus ED60, etc.) of the components or may further include other components. One or more of the components may be implemented as an integrated circuit. For example, the sensor module ED76 (an LWIR sensor, fingerprint sensor, an iris sensor, an illumination sensor, etc.) may be embedded in the display apparatus ED60 (a display, etc.). Also, when the image sensor CM30 includes a spectroscopic function, some functions (a color sensor, an illumination sensor, etc.) of the sensor module ED76 may be directly implemented in the image sensor CM30 rather than as an additional sensor module.

The processor ED20 may execute software (a program ED40, etc.) to control one or more components (hardware or software components) of the electronic device ED01, the components being connected to the processor ED20, and to perform various data processing or calculations. As part of the data processing or calculations, the processor ED20 may load a command and/or data received from other components (the sensor module ED76, the communication module ED90, etc.) into a volatile memory ED32, process the command and/or the data stored in the volatile memory ED32, and store resultant data in a nonvolatile memory ED34. The processor ED20 may include a main processor ED21 (a central processing unit (CPU), an application processor (AP), etc.) and an auxiliary processor ED23 (a graphics processing unit (GPU), an image signal processor, a sensor hub processor, a communication processor, etc.) which may independently operate or operate with the main processor ED21. The auxiliary processor ED23 may use less power than the main processor ED21 and may perform specialized functions.

When the main processor ED21 is in an inactive state (a sleep state), the auxiliary processor ED23, instead of the main processor ED21, may control functions and/or states related to one or more (the display apparatus ED60, the sensor module ED76, the communication module ED90, etc.) of the components of the electronic device ED01. Alternatively, when the main processor ED21 is in an active state (an application execution state), the auxiliary processor ED23 may perform the above operation together with the main processor ED21. The auxiliary processor ED23 (an image signal processor, a communication processor, etc.) may be implemented as part of other functionally-related components (the camera module ED80, the communication module ED90, etc.).

The memory ED30 may store various data required by the components (the processor ED20, the sensor module ED76, etc.) of the electronic device ED01. The data may include, for example, software (the program ED40, etc.), input data and/or output data of a command related to the software. The memory ED30 may include the volatile memory ED32 and/or the nonvolatile memory ED34. The volatile memory ED32 may include an embedded memory ED36 fixedly mounted in the electronic device ED01 and a detachable external memory ED38.

The program ED40 may be stored in the memory ED30 as software, and may include an operating system ED42, middleware ED44, and/or an application ED46.

The input device ED50 may receive a command and/or data to be used by the components (the processor ED20, etc.) of the electronic device ED01 from the outside (a user, etc.) of the electronic device ED01. The input device ED50 may include a microphone, a mouse, a keyboard, and/or a digital pen (a stylus pen, etc.).

The sound output device ED55 may output a sound signal to the outside of the electronic device ED01. The sound output device ED55 may include a speaker and/or a receiver. The speaker may be used for a general purpose, such as multimedia playing or recording playing, and the receiver may be used to receive an incoming call. The receiver may be coupled to the speaker as part of the speaker or may be implemented as a separate device.

The display apparatus ED60 may visually provide information to the outside of the electronic device ED01. The display apparatus ED60 may include a display, a hologram device, or a controlling circuit for controlling a projector and a corresponding device. The display apparatus ED60 may include touch circuitry configured to sense a touch operation and/or sensor circuitry (a pressure sensor, etc.) configured to measure an intensity of a force generated by the touch operation.

The audio module ED70 may convert sound into an electrical signal or an electrical signal into sound. The audio module ED70 may obtain sound via the input device ED50 or may output sound via the sound output device ED55 and/or a speaker and/or a headphone of another electronic device (the electronic device ED02, etc.) directly or wirelessly connected to the electronic device ED01.

The sensor module ED76 may sense an operation state (power, temperature, etc.) of the electronic device ED01 or an external environmental state (a user state, etc.) and generate electrical signals and/or data values corresponding to the sensed state. The sensor module ED76 may include a gesture sensor, a gyro-sensor, an atmospheric sensor, a magnetic sensor, an acceleration sensor, a grip sensor, a proximity sensor, a color sensor, an infrared (IR) sensor, an LWIR sensor, a biometric sensor, a temperature sensor, a humidity sensor, and/or an illumination sensor. The LWIR sensor may include any one of the LWIR sensors 11, 12, 13, 14, 20, and 1000 described above.

The interface ED77 may support one or more designated protocols to be used for the electronic device ED01 to be directly or wirelessly connected to another electronic device (the electronic device ED02, etc.). The interface ED77 may include a high-definition multimedia interface (HDMI) interface, a universal serial bus (USB) interface, an SD card interface, and/or an audio interface.

The connection terminal ED78 may include a connector, through which the electronic device ED01 may be physically connected to another electronic device (the electronic device ED02, etc.). The connection terminal ED78 may include an HDMI connector, a USB connector, an SD card connector, and/or an audio connector (a headphone connector, etc.).

The haptic module ED79 may convert an electrical signal into a mechanical stimulus (vibration, motion, etc.) or an electrical stimulus which is recognizable to a user via haptic or motion sensation. The haptic module ED79 may include a motor, a piezoelectric device, and/or an electrical stimulus device.

The camera module ED80 may capture a still image and a video. The camera module ED80 may include a lens assembly including one or more lenses, an image sensor, image signal processors, and/or flashes. The lens assembly included in the camera module ED80 may collect light emitted from an object, an image of which is to be captured.

The power management module ED88 may manage power supplied to the electronic device ED01. The power management module ED88 may be implemented as part of a power management integrated circuit (PMIC).

The battery ED89 may supply power to the components of the electronic device ED01. The battery ED89 may include a non-rechargeable primary battery, a rechargeable secondary battery, and/or a fuel battery.

The communication module ED90 may support establishment of direct (wired) communication channels and/or wireless communication channels between the electronic device ED01 and the other electronic devices (the electronic device ED02, the electronic device ED04, the server ED08, etc.) and may support communication through the established communication channels. The communication module ED90 may include one or more communication processors separately operating from the processor ED20 (the AP, etc.) and supporting direct communication and/or wireless communication. The communication module ED90 may include a wireless communication module ED92 (a cellular communication module, a short-range wireless communication module, a global navigation satellite system (GNSS) communication module, etc.) and/or a wired communication module ED94 (a local area network (LAN) communication module, a power line communication module, etc.). A corresponding communication module from among these communication modules may communicate with other electronic devices through the first network ED98 (a short-range wireless communication network, such as Bluetooth, Wifi direct, or IR data association (IrDa)) or the second network ED99 (a remote communication network, such as a cellular network, the Internet, or a computer network (a LAN, a wide area network (WAN), etc.)). Various types of communication modules described above may be integrated into a single component (a single chip, etc.) or implemented as a plurality of components (a plurality of chips). The wireless communication module ED92 may identify and authenticate the electronic device ED01 within a communication network, such as the first network ED98 and/or the second network ED99, by using subscriber information (international mobile subscriber identification (IMSI), etc.) stored in the subscriber identification module ED96.

The antenna module ED97 may transmit or receive a signal and/or power to or from the outside (other electronic devices, etc.). The antenna module ED79 may include an emitter including a conductive pattern formed on a substrate (a PCB, etc.). The antenna module ED97 may include one or more antennas. When the antenna module ED97 includes a plurality of antennas, an antenna which is suitable for a communication method used in a communication network, such as the first network ED98 and/or the second network ED99, may be selected. Through the selected antenna, signals and/or power may be transmitted or received between the communication module ED90 and the other electronic devices. In addition to the one or more antennas, another component (a radio frequency integrated circuit (RFIC), etc.) may be included in the antenna module ED97.

One or more of the components of the electronic device ED01 may be connected to one another and exchange signals (commands, data, etc.) with one another, through a communication method performed among peripheral devices (a bus, general purpose input and output (GPIO), a serial peripheral interface (SPI), a mobile industry processor interface (MIPI), etc.).

The commands or the data may be transmitted or received between the electronic device ED01 and the external electronic device ED04 via the server ED08 connected to the second network ED99. The other electronic devices ED02 and ED04 may be homogeneous or heterogeneous electronic devices with respect to the electronic device ED01. All or part of operations performed by the electronic device ED01 may be performed by one or more of the other electronic devices ED02 and ED04 and the server ED08. For example, when the electronic device ED01 has to perform a function or a service, instead of directly performing the function or the service, the one or more of the other electronic devices may be requested to perform part or all of the function or the service. The one or more of the other electronic devices receiving the request may perform an additional function or service related to the request and may transmit a result of the execution to the electronic device ED01. To this end, cloud computing, distribution computing, and/or client-server computing techniques may be used.

Figure 16:
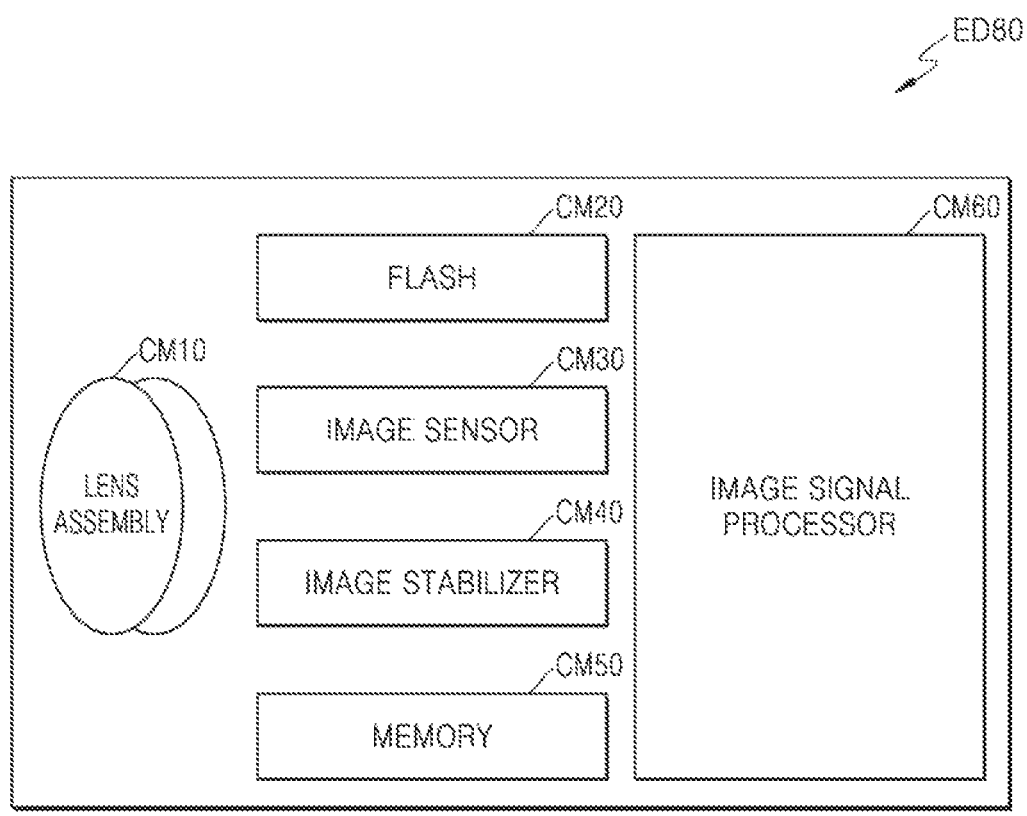
FIG. 16 is a block diagram of a camera module of FIG. 15.
Figure 17:
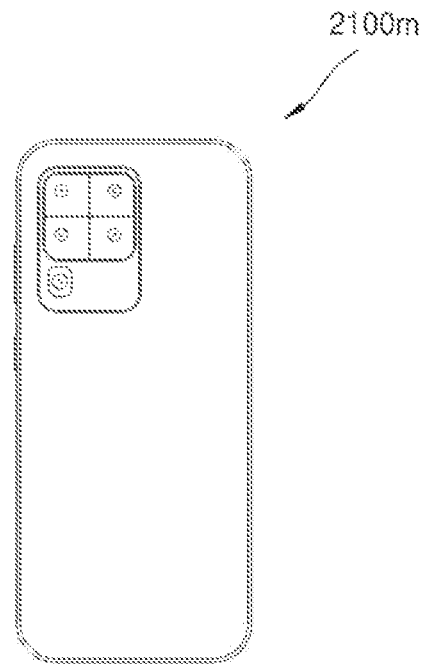
FIGS. 17, 18, 19, 20, 21, 22, 23, 24, 25, and 26 are diagrams of various examples of an electronic device in which an image sensor is implemented, according to example embodiments.
Figure 18:
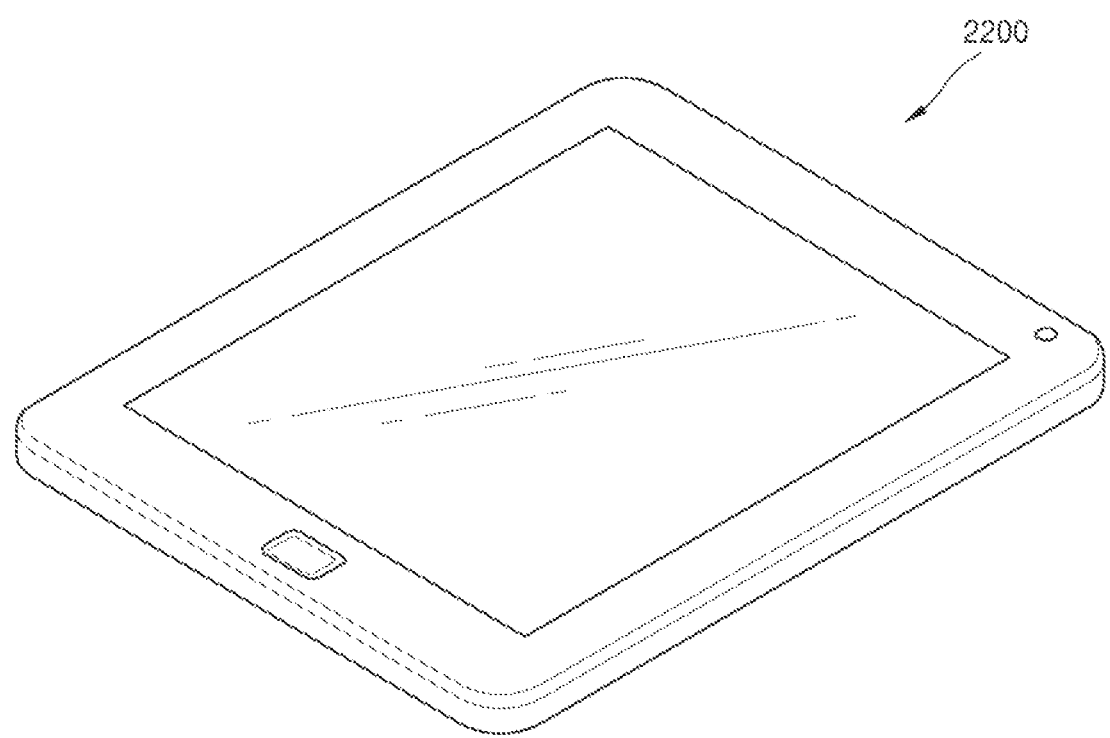
Figure 19:
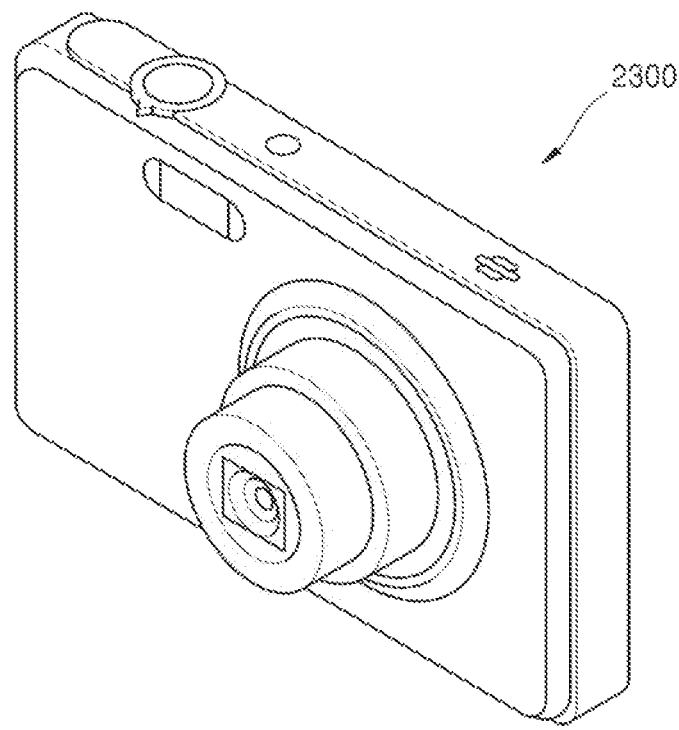
Figure 20:
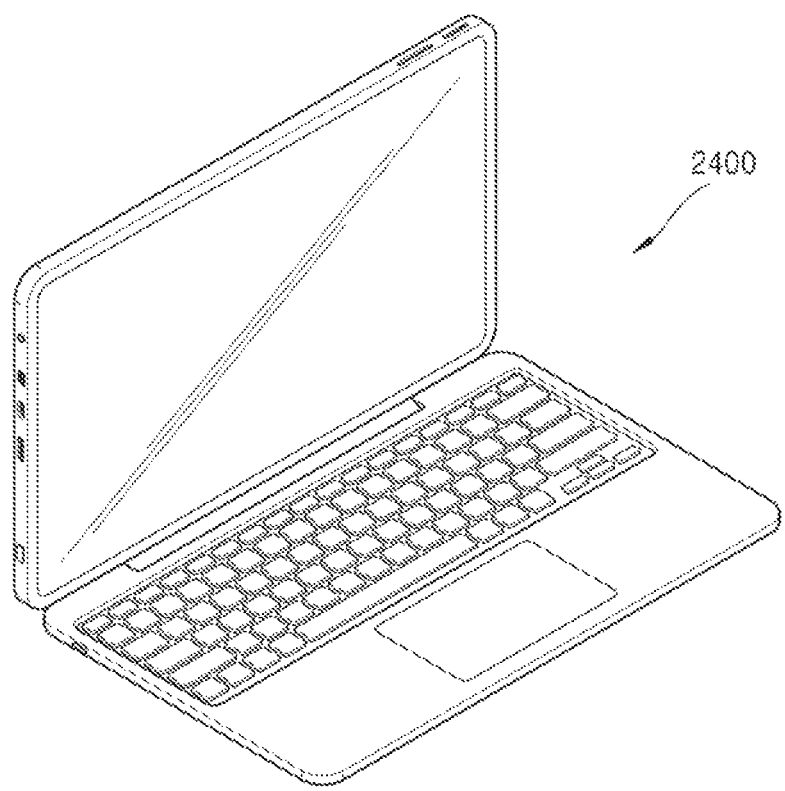
Figure 21:
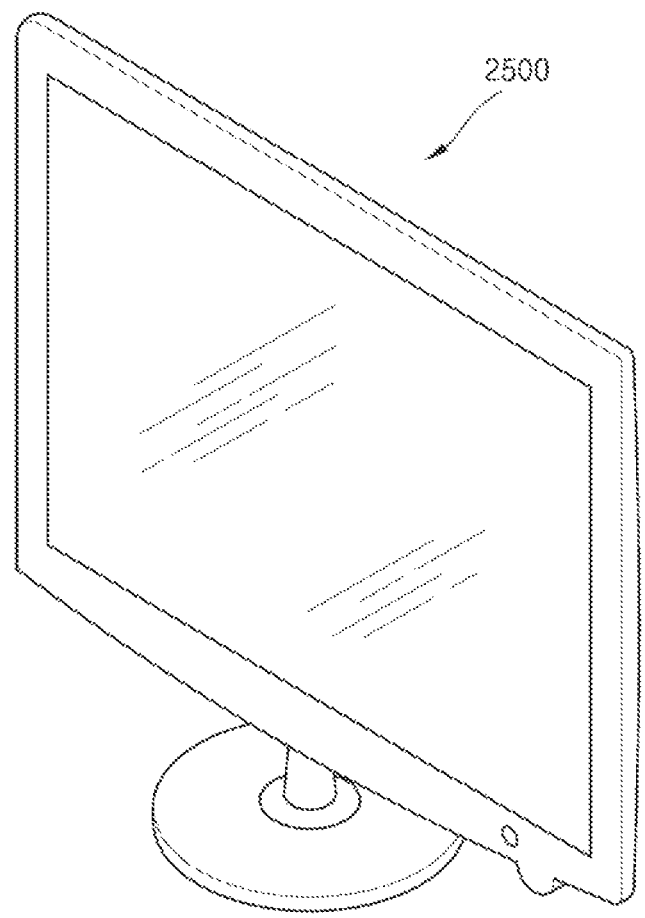

FIG. 16 is a block diagram of the camera module ED80 of FIG. 15.

Referring to FIG. 16, the camera module ED80 may include a lens assembly CM10, a flash CM20, an image sensor CM30, an image stabilizer CM40, a memory CM50 (a buffer memory, etc.), and/or an image signal processor CM60.

The lens assembly CM10 may collect light emitted from an object, an image of which is to be captured. The camera module ED80 may include a plurality of lens assemblies CM10, and in this case, the camera module ED80 may include a dual camera, a 360-degree camera, or a spherical camera. Some of the plurality of lens assemblies CM10 may have the same or different lens properties (a viewing angle, a focal distance, an automatic focal point, an F number, an optical zoom, etc.). The lens assemblies CM10 may include a wide-angle lens or a telephoto lens.

The flash CM20 may emit light that is used to intensify light emitted or reflected from the object. The flash CM20 may include one or more light-emitting diodes (LEDs) (a red-green-blue (RGB) LED, a white LED, and an IR LED, an ultraviolet (UV) LED, etc.) and/or a Xenon lamp. The image sensor CM30 may convert light emitted or reflected from the object and transmitted through the lens assembly CM10 into an electrical signal to obtain an image corresponding to the object. The image sensor CM30 may include an LWIR sensor and may further include one or more sensors selected from image sensors having different properties, such as an IR sensor or a UV sensor, in addition to an RGB sensor, a black and white (BW) sensor, and the LWIR sensor. The LWIR sensor may include any one of the LWIR sensors 11, 12, 13, 14, 20, and 1000 described above.

The image stabilizer CM40 may move one or more lenses included in the lens assembly CM10 or move the image sensor CM30 in a specific direction in response to a motion of the camera module ED80 or the electronic device CM01 including the camera module ED80 or may compensate for a negative effect due to the motion by controlling (adjusting read-out timing, etc.) the operation characteristics of the image sensor CM30. The image stabilizer CM40 may sense the motion of the camera module ED80 or the electronic device ED01 by using a gyro sensor (not shown) or an acceleration sensor (not shown) arranged inside or outside the camera module ED80. The image stabilizer CM40 may be implemented in an optical fashion.

The memory CM50 may store part or all of image data obtained through the image sensor CM30 for next image processing operations. For example, when a plurality of images are obtained at a high speed, obtained original data (Bayer-patterned data, high-resolution data, etc.) may be stored in the memory CM50, and after only a low resolution image may be displayed, the original data of a selected image (a user selection, etc.) may be transmitted to the signal processor CM60. The memory CM50 may be integrated in the memory ED30 of the electronic device ED01 or may be implemented as a separate memory independently operating.

The image signal processor CM60 may perform image processing on the image obtained through the image sensor CM30 or the image data stored in the memory CM50. The image processing may include depth map generation, three-dimensional modeling, panorama generation, attribute point extraction, image synthesis, and/or image compensation (noise reduction, resolution adjustment, brightness adjustment, blurring, sharpening, softening, etc.). The image signal processor CM60 may control (control an exposure time or control read-out timing of) components (the image sensor CM30, etc.) included in the camera module ED80. The image processed by the image signal processor CM60 may be stored again in the memory CM50 for additional processing or may be provided to the external components (the memory ED30, the display apparatus ED60, the electronic device ED02, the electronic device ED04, the server ED08, etc.) of the camera module ED80. The image signal processor CM60 may be integrated in the processor ED20 or may be implemented as an additional processor independently operating from the processor ED20. When the image signal processor CM60 is implemented as a separate processor from the processor ED20, the image processed by the image signal processor CM60 may be further image-processed by the processor ED20 and may be displayed through the display apparatus ED60.

The electronic device ED01 may include a plurality of camera modules ED80 each having a different attribute or function. In this case, one of the plurality of camera modules ED80 may be a wide-angle camera, and another of the plurality of camera modules ED80 may be a telephoto camera. Similarly, one of the plurality of camera modules ED80 may be a front camera, and another of the plurality of camera modules ED80 may be a rear camera.

FIGS. 17 through 26 are diagrams of various examples of an electronic device in which an image sensor is implemented, according to example embodiments. The image sensor may be substantially the same as the image sensor CM30 described with reference to FIGS. 15 and 16.

Referring to FIGS. 17 through 26, the image sensor may be implemented in various electronic devices. The image sensor may be implemented in a mobile phone or a smartphone 2100m illustrated in FIG. 17, a tablet or a smart tablet 2200 illustrated in FIG. 18, a digital camera or a camcorder 2300 illustrated in FIG. 19, a notebook computer 2400 illustrated in FIG. 20, or a television or a smart television 2500 illustrated in FIG. 21. For example, the smartphone 2100m or the smart tablet 2200 may include a plurality of high resolution cameras, in each of which a high-resolution image sensor is mounted, may extract depth information of objects in an image by using the plurality of high-resolution cameras, may adjust out-focusing of the image, may automatically identify the objects in the image, or may obtain a thermal image of the objects in the image.

Figure 22:
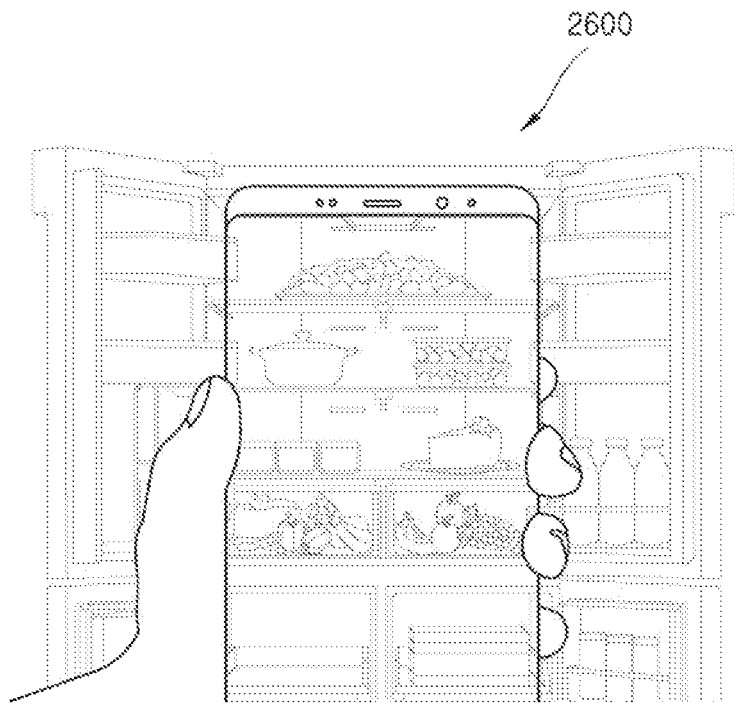
Figure 23:
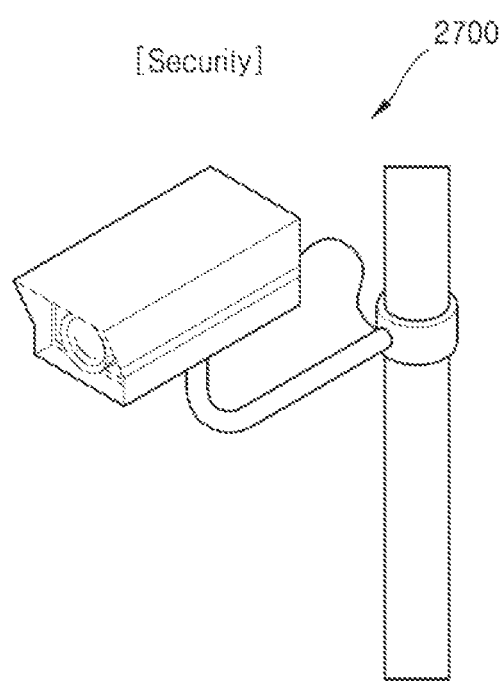
Figure 24:
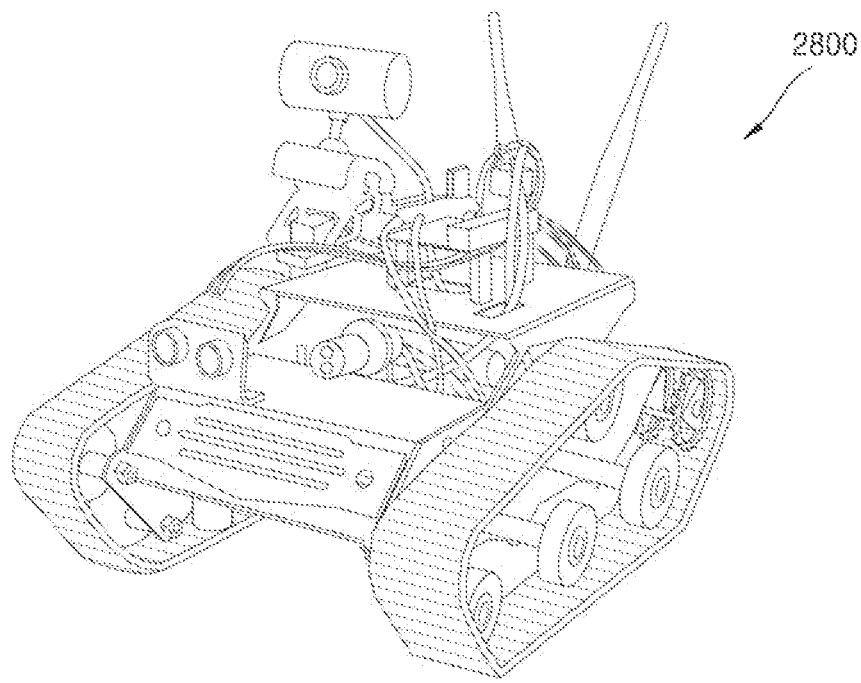
Figure 25:
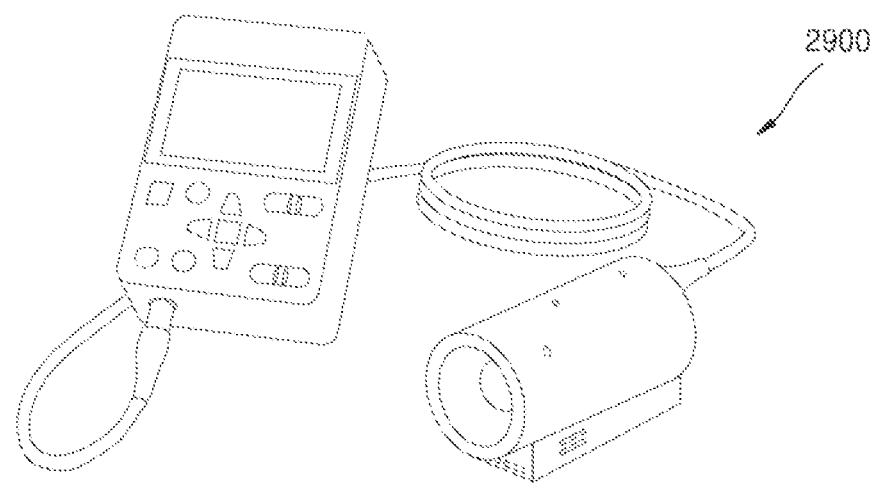

In addition, the image sensor may be implemented in a smart refrigerator 2600 illustrated in FIG. 22, a security camera 2700 illustrated in FIG. 23, a robot 2800 illustrated in FIG. 24, a medical camera 2900 illustrated in FIG. 25, etc. For example, the smart refrigerator 2600 may obtain a thermal image of food in the refrigerator by using an image sensor, may automatically recognize the food in the refrigerator, and may notify a user of the presence of specific food, types of foods that are stocked or shipped, etc. by using a smartphone. The security camera 2700 may provide an ultra-high-resolution image and may allow recognition of an object or a human being in the image even in a dark environment through a high sensitivity. The robot 2800 may be dispatched in a disastrous or industrial situation that a human being cannot access and may provide a high-resolution image or a zero image. The medical camera 2900 may provide a high-resolution image or a zero image for a diagnosis or an operation and may dynamically adjust a viewing sight.

Figure 26:
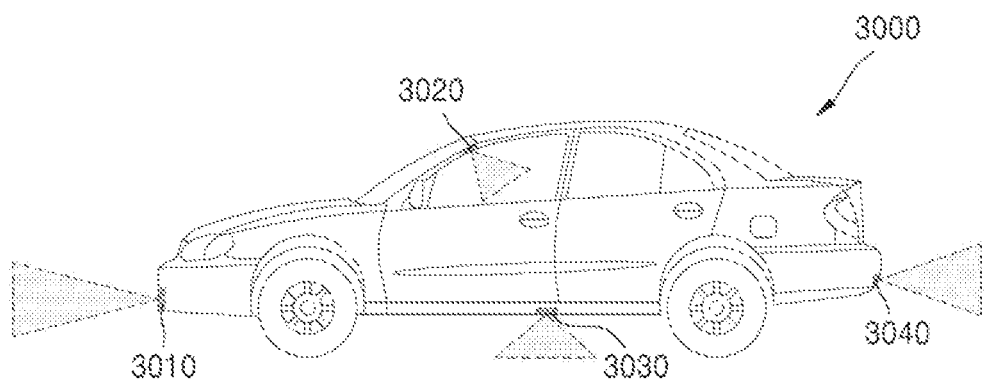

Also, the image sensor may be implemented in a vehicle 3000 as illustrated in FIG. 26. The vehicle 3000 may include a plurality of vehicle cameras 3010, 3020, 3030, and 3040 arranged in various locations, and each vehicle camera 3010, 3020, 3030, or 3040 may include an image sensor according to an embodiment. The vehicle 3000 may provide a user with various information about an inner environment or a peripheral environment of the vehicle 3000 by using the plurality of vehicle cameras 3010, 3020, 3030, and 3040 and may automatically recognize an object or a human being in an image and provide information required for autonomous driving.

The example embodiments may provide a miniaturized LWIR sensor and an electronic device including the same.

The example embodiments may provide a method of manufacturing the LWIR sensor, the method having the excellent compatibility with a general semiconductor process, a low difficulty of a manufacturing process, and reduced manufacturing time and costs.

However, effects of the example embodiments are not limited the descriptions above.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A long-wave infrared (LWIR) sensor comprising:
    a substrate;
    a magnetic resistance device on the substrate; and
    an LWIR absorption layer on the magnetic resistance device, the LWIR absorption layer being configured to absorb LWIR rays and generate heat,
    wherein a resistance of the magnetic resistance device changes based on temperature change based on the heat generated by the LWIR absorption layer.

2. The LWIR sensor of claim 1, wherein the magnetic resistance device comprises:
    a first magnetic layer;
    a second magnetic layer on the first magnetic layer; and
    a tunneling barrier layer between the first magnetic layer and the second magnetic layer.

3. The LWIR sensor of claim 1, wherein a thermal stability of the magnetic resistance device is less than 10.

4. The LWIR sensor of claim 1, wherein a width of the magnetic resistance device ranges from 1 nm to 100 nm.

5. The LWIR sensor of claim 1, further comprising a reflective layer provided between the substrate and the magnetic resistance device.

6. The LWIR sensor of claim 1, further comprising an insulating layer provided adjacent to a side surface of the magnetic resistance device.

7. The LWIR sensor of claim 1, further comprising a transmissive cap provided on the substrate,
    wherein the transmissive cap is provided on the magnetic resistance device and the LWIR absorption layer.

8. The LWIR sensor of claim 7, wherein an air pressure of an area inside of the transmissive cap is lower than an air pressure outside of the transmissive cap.

9. The LWIR sensor of claim 8, wherein the transmissive cap is configured to selectively transmit LWIR rays.

10. The LWIR sensor of claim 7, further comprising a focusing lens provided on a first side of the transmissive cap, the side being opposite to a second side of the transmission cap on which the LWIR absorption layer is provided.

11. The LWIR sensor of claim 10, wherein the focusing lens is configured to selectively transmit LWIR rays.

12. A long-wave infrared (LWIR) sensor comprising:
    a plurality of pixels provided in a plurality of rows and a plurality of columns,
    wherein each of the plurality of pixels comprises:
        a substrate;
        a magnetic resistance device on the substrate; and
        an LWIR absorption layer on the magnetic resistance device,
    wherein a resistance of the magnetic resistance device changes based on temperature, and
    wherein the LWIR absorption layer is configured to absorb LWIR rays and emit heat.

13. The LWIR sensor of claim 12, wherein the magnetic resistance device comprises:
    a first magnetic layer;
    a second magnetic layer on the first magnetic layer; and
    a tunneling barrier layer between the first magnetic layer and the second magnetic layer.

14. The LWIR sensor of claim 13, wherein a thermal stability of the magnetic resistance device is less than 10.

15. The LWIR sensor of claim 12, wherein the plurality of pixels further comprise a plurality of transmissive caps, respectively, and
wherein each of the plurality of transmissive caps is provided on the magnetic resistance device and the LWIR absorption layer.

16. The LWIR sensor of claim 15, wherein an air pressure of areas inside of the plurality of transmissive caps is lower than an air pressure outside of the plurality of transmissive caps.

17. The LWIR sensor of claim 12, wherein the plurality of pixels further comprise a plurality of focusing lenses, respectively, and
wherein the plurality of focusing lenses face the plurality of transmissive caps, respectively.

18. The LWIR sensor of claim 12, wherein the plurality of pixels further comprise a plurality of reflective layers, respectively, and
wherein each of the plurality of reflective layers is provided between the substrate and the magnetic resistance device.

19. The LWIR sensor of claim 12, wherein in each of the plurality of pixels, the magnetic resistance device is provided as a single magnetic resistance device or a plurality of magnetic resistance devices.

20. An electronic device comprising:
a long-wave infrared (LWIR) sensor; and
a processor configured to receive a sensing signal from the LWIR sensor and process the sensing signal,
wherein the LWIR sensor comprises:
a substrate;
a magnetic resistance device on the substrate; and
an LWIR absorption layer on the magnetic resistance device,
wherein a resistance of the magnetic resistance device changes based on temperature, and
wherein the LWIR absorption layer is configured to absorb LWIR rays and emit heat.

* * * * *